United States Patent
Kirwin et al.

(10) Patent No.: US 9,996,261 B2
(45) Date of Patent: *Jun. 12, 2018

(54) SYSTEMS AND METHODS FOR PROVIDING A TRADING INTERFACE

(75) Inventors: Glenn D. Kirwin, Scarsdale, NY (US); Matthew Claus, Summit, NJ (US); Joseph Noviello, New York, NY (US); Andrew C. Gilbert, Califon, NJ (US)

(73) Assignee: CHART TRADING DEVELOPMENT, LLC, Tyler, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/614,412

(22) Filed: Sep. 13, 2012

(65) Prior Publication Data

US 2013/0166429 A1 Jun. 27, 2013

Related U.S. Application Data

(63) Continuation of application No. 12/789,122, filed on May 27, 2010, and a continuation of application No.
(Continued)

(51) Int. Cl.
*G06F 3/0489* (2013.01)
*G06Q 20/10* (2012.01)
(Continued)

(52) U.S. Cl.
CPC ......... *G06F 3/04895* (2013.01); *G06Q 20/10* (2013.01); *G06Q 20/102* (2013.01);
(Continued)

(58) Field of Classification Search
CPC ............ A63F 9/22; G06F 17/40; G06F 17/60; G06Q 40/00
See application file for complete search history.

(56) References Cited

U.S. PATENT DOCUMENTS

| 3,573,747 A | 4/1971 | Adams et al. |
| 3,976,840 A | 8/1976 | Cleveland et al. |
| (Continued) | | |

FOREIGN PATENT DOCUMENTS

| CA | 2140164 | 1/1995 |
| CA | 2371673 | 11/2000 |
| (Continued) | | |

OTHER PUBLICATIONS

Fan, M. (1999). The design and development of a web-based financial bundle trading market (Order No. 9959482). Available from ProQuest Central; ProQuest Dissertations & Theses Global. (304527929). Retrieved from https://search.proquest.com/docview/304527929?accountid=14753.*

(Continued)

*Primary Examiner* — Muriel S Tinkler

(57) ABSTRACT

Systems and methods for configurable trading interfaces that allow a trader to quickly and easily submit trading commands to a trading system are provided. Using these systems and methods, a trader can using various trading interfaces to initiate trading commands, configure various display features and default command settings, and control a level of command entry verification that is provided to protect against inadvertent entry of incorrect trading commands.

9 Claims, 12 Drawing Sheets

Related U.S. Application Data

12/789,006, filed on May 27, 2010, now Pat. No. 8,060,435, and a continuation of application No. 11/756,964, filed on Jun. 1, 2007, now Pat. No. 8,041,626, and a continuation of application No. 11/756,875, filed on Jun. 1, 2007, now Pat. No. 7,890,416, which is a continuation of application No. 09/745,651, filed on Dec. 22, 2000, now Pat. No. 7,991,679.

(60) Provisional application No. 60/171,442, filed on Dec. 22, 1999.

(51) Int. Cl.
*G06Q 30/08* (2012.01)
*G06Q 40/00* (2012.01)
*G06Q 40/02* (2012.01)
*G06Q 40/04* (2012.01)
*G06Q 40/06* (2012.01)

(52) U.S. Cl.
CPC ......... *G06Q 20/105* (2013.01); *G06Q 20/108* (2013.01); *G06Q 30/08* (2013.01); *G06Q 40/00* (2013.01); *G06Q 40/025* (2013.01); *G06Q 40/04* (2013.01); *G06Q 40/06* (2013.01); *G06Q 40/10* (2013.01)

(56) References Cited

U.S. PATENT DOCUMENTS

| | | |
|---|---|---|
| 4,588,192 A | 5/1986 | Laborde |
| 4,674,044 A | 6/1987 | Kalmus et al. |
| 4,903,201 A | 2/1990 | Wagner |
| 4,942,616 A | 7/1990 | Linstroth et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,189,238 A | 2/1993 | Hayakawa |
| 5,243,515 A | 9/1993 | Lee |
| 5,297,031 A | 3/1994 | Gutterman et al. |
| 5,297,032 A | 3/1994 | Troian et al. |
| 5,375,055 A | 12/1994 | Togher et al. |
| 5,394,324 A | 2/1995 | Clearwater |
| 5,463,547 A | 10/1995 | Markowitz et al. |
| 5,596,347 A | 1/1997 | Robertson et al. |
| 5,640,569 A | 6/1997 | Miller et al. |
| 5,682,206 A | 10/1997 | Wehmeyer |
| 5,689,652 A | 11/1997 | Lupien et al. |
| 5,715,402 A | 2/1998 | Popolo |
| 5,724,357 A | 3/1998 | Derks |
| 5,724,524 A | 3/1998 | Hunt et al. |
| 5,727,165 A | 3/1998 | Ordish et al. |
| 5,787,402 A | 7/1998 | Potter et al. |
| 5,797,002 A | 8/1998 | Patterson |
| 5,805,167 A | 9/1998 | Van Cruyningen |
| 5,809,483 A | 9/1998 | Broka et al. |
| 5,815,657 A | 9/1998 | Williams et al. |
| 5,845,266 A | 12/1998 | Lupien et al. |
| 5,870,724 A | 2/1999 | Lawlor et al. |
| 5,905,975 A | 5/1999 | Ausubel |
| 5,924,082 A | 7/1999 | Silverman et al. |
| 5,924,083 A | 7/1999 | Silverman et al. |
| 5,950,177 A | 9/1999 | Lupien et al. |
| 5,960,411 A | 9/1999 | Hartman et al. |
| 5,963,924 A | 10/1999 | Williams et al. |
| 5,973,619 A | 10/1999 | Paredes |
| 6,012,046 A | 1/2000 | Lupien et al. |
| 6,014,643 A * | 1/2000 | Minton ............... G06Q 20/102 705/26.4 |
| 6,016,484 A | 1/2000 | Williams et al. |
| 6,064,981 A | 5/2000 | Barni et al. |
| 6,068,552 A * | 5/2000 | Walker ............... G07F 17/323 273/139 |
| 6,098,051 A | 8/2000 | Lupien et al. |
| 6,112,189 A | 8/2000 | Rickard et al. |
| 6,115,698 A | 9/2000 | Tuck et al. |
| 6,131,087 A | 10/2000 | Luke et al. |
| 6,134,535 A | 10/2000 | Belzberg |
| 6,161,099 A | 12/2000 | Harrington et al. |
| 6,181,340 B1 | 1/2001 | Alimpich et al. |
| 6,195,647 B1 | 2/2001 | Martyn et al. |
| 6,233,566 B1 | 5/2001 | Levine et al. |
| 6,236,972 B1 | 5/2001 | Shkedy |
| 6,247,000 B1 | 6/2001 | Hawkins et al. |
| 6,260,024 B1 | 7/2001 | Shkedy |
| 6,260,025 B1 | 7/2001 | Silverman et al. |
| 6,272,474 B1 | 8/2001 | Garcia |
| 6,278,982 B1 | 8/2001 | Korhammer et al. |
| 6,343,278 B1 | 1/2002 | Jain et al. |
| 6,408,282 B1 | 6/2002 | Buist |
| 6,418,419 B1 | 7/2002 | Nieboer et al. |
| 6,421,653 B1 | 7/2002 | May |
| 6,473,744 B1 | 10/2002 | Tuck et al. |
| 6,519,574 B1 | 2/2003 | Wilton et al. |
| 6,766,304 B2 | 7/2004 | Kemp, II et al. |
| 6,772,132 B1 | 8/2004 | Kemp, II et al. |
| 6,809,741 B1 | 10/2004 | Bates et al. |
| 6,836,799 B1 * | 12/2004 | Philyaw ............ G06F 17/30699 705/14.66 |
| 6,904,602 B1 | 6/2005 | Chow et al. |
| 6,938,011 B1 | 8/2005 | Kemp, II et al. |
| 6,993,504 B1 | 1/2006 | Freisen et al. |
| 7,006,991 B2 | 2/2006 | Keiser et al. |
| 7,020,632 B1 | 3/2006 | Kohls et al. |
| 7,080,033 B2 | 7/2006 | Wilton et al. |
| 7,085,739 B1 | 8/2006 | Winter et al. |
| 7,089,205 B1 | 8/2006 | Abernathy |
| 7,113,190 B2 | 9/2006 | Heaton |
| 7,127,424 B2 | 10/2006 | Kemp, II et al. |
| 7,155,410 B1 | 12/2006 | Woodmansey et al. |
| 7,171,386 B1 | 1/2007 | Raykhman |
| 7,184,970 B1 | 2/2007 | Squillante |
| 7,212,999 B2 * | 5/2007 | Friesen ............... G06Q 20/10 345/440.2 |
| 7,225,150 B2 | 5/2007 | Wilton et al. |
| 7,243,083 B2 | 7/2007 | Burns et al. |
| 7,379,910 B2 | 5/2008 | Abrahm et al. |
| 7,389,268 B1 | 6/2008 | Kemp, II et al. |
| 7,415,436 B1 | 8/2008 | Evelyn et al. |
| 7,505,915 B2 | 3/2009 | Silverman et al. |
| 7,505,932 B2 | 3/2009 | Kemp, II et al. |
| 7,542,943 B2 | 6/2009 | Caplan et al. |
| 7,577,602 B2 | 8/2009 | Singer |
| 7,599,856 B2 | 10/2009 | Agrawal et al. |
| 7,689,489 B2 | 3/2010 | Fergusson |
| 7,707,086 B2 | 4/2010 | Burns et al. |
| 7,720,742 B1 | 5/2010 | Mauro et al. |
| 7,725,383 B2 | 5/2010 | Wilton et al. |
| 7,890,416 B2 | 2/2011 | Kirwin et al. |
| 7,991,679 B2 | 8/2011 | Kirwin et al. |
| 8,041,626 B2 | 10/2011 | Kirwin et al. |
| 8,060,435 B2 | 11/2011 | Kirwin et al. |
| 8,380,611 B2 | 2/2013 | Heaton |
| 9,175,978 B2 | 11/2015 | Hall |
| 9,412,349 B2 | 8/2016 | Little et al. |
| 2002/0091615 A1 | 7/2002 | Salvani |
| 2002/0111907 A1 | 8/2002 | Ling |
| 2002/0120546 A1 | 8/2002 | Zajac |
| 2002/0120547 A1 | 8/2002 | Zajac |
| 2002/0120551 A1 | 8/2002 | Jones, III |
| 2003/0004862 A1 | 1/2003 | Lutnick et al. |
| 2003/0018558 A1 | 1/2003 | Heffner et al. |
| 2003/0023542 A1 | 1/2003 | Kemp, II et al. |
| 2003/0041000 A1 | 2/2003 | Zajac et al. |
| 2003/0061069 A1 | 3/2003 | Silverman et al. |
| 2003/0083495 A1 | 5/2003 | Gilbert |
| 2003/0088499 A1 | 5/2003 | Gilbert et al. |
| 2003/0088509 A1 | 5/2003 | Wilton et al. |
| 2003/0097325 A1 | 5/2003 | Friesen et al. |
| 2003/0120574 A1 | 6/2003 | Wallman |
| 2003/0120575 A1 | 6/2003 | Wallman |
| 2003/0154152 A1 | 8/2003 | Gilbert et al. |

(56) References Cited

U.S. PATENT DOCUMENTS

| | | | |
|---|---|---|---|
| 2006/0053074 A1 | 3/2006 | Wilton et al. | |
| 2006/0059082 A1 | 3/2006 | Silverman et al. | |
| 2008/0033865 A1 | 2/2008 | Wilton et al. | |
| 2008/0071664 A1 | 3/2008 | Silverman et al. | |
| 2010/0325029 A1 | 12/2010 | Kirwin et al. | |

FOREIGN PATENT DOCUMENTS

| | | |
|---|---|---|
| CA | 2380848 | 2/2001 |
| EP | 0388162 A2 | 9/1990 |
| EP | 0399850 | 11/1990 |
| EP | 0491455 | 6/1992 |
| EP | 0512702 A2 | 11/1992 |
| EP | 0665489 | 8/1995 |
| EP | 0625275 | 4/1997 |
| EP | 0 987 644 | 3/2000 |
| EP | 1100030 | 5/2001 |
| JP | 11-25158 | 1/1999 |
| WO | WO 93/15467 | 8/1993 |
| WO | WO 95/26005 | 9/1995 |
| WO | WO 98/49639 | 11/1998 |
| WO | WO 99/19821 | 4/1999 |
| WO | WO 99/26175 | 5/1999 |
| WO | WO 00/21013 | 4/2000 |
| WO | WO 00/28450 | 5/2000 |
| WO | WO 00/58862 | 10/2000 |
| WO | WO 01/16830 | 3/2001 |
| WO | WO 01/16852 | 3/2001 |
| WO | WO 01/46841 | 6/2001 |

OTHER PUBLICATIONS

Gerlach, D. (Feb. 1999). Trading places: The top online brokers. PC World, 17, 177-185. Retrieved from https://search.proquest.com/docview/231366804?accountid=14753.*
Final Written Decision, *CQG, Inc., et al. v. Chart Trading Development, LLC*, CBM2016-00046 (Sep. 1, 2017).
Final Written Decision, *CQG, Inc., et al. v. Chart Trading Development, LLC*, CBM2016-00047 (Sep. 1, 2017).
Final Written Decision, *CQG, Inc., et al. v. Chart Trading Development, LLC*, CBM2016-00048 (Sep. 1, 2017).
Definition of "interface," Microsoft Computer Dictionary 241 (4th ed. 1999).
Definition of "interactive," the Computer Desktop Encyclopedia 457 (2d ed. 1999).
Definition of "graphical user interface," Microsoft Computer Dictionary 207 (4th ed. 1999).
Definition of "computer," Microsoft Computer Dictionary 102 (4th ed. 1999).
Definition of "interactive," Microsoft Computer Dictionary 240 (4th ed. 1999).
Definition of "interface," the Computer Desktop Encyclopedia 458 (2d ed. 1999).
Definition of "command-line interface," Microsoft Computer Dictionary 96 (4th ed. 1999).
Definition of "interactive," Microsoft Computer Dictionary. 279 (5th ed. 2002).
Definition of "dialog box," Microsoft Computer Dictionary 156 (5th ed. 2002).
Definition of "select," Merriam-Webster's Collegiate Dictionary 1056 (10th ed. 2001).
Gorham et al., "Electronic Exchanges: The Global Transformation from Pits to Bits" (excerpts) Elsevier, Amsterdam (2009).
Reimer, J., "A History of the GUI," Arstechnica.com (May 5, 2005).
Myers, B. "A Brief History of Human-Computer Interaction Technology," *Interactions Magazine*, 5 (2) 44-54 (Mar./Apr. 1998).
Web Archives, "Executing Trades Has Never Been Easier," available at https://web.archive.org/web/20160420231421/http://www.cqg.com/solutions/electronictrading/trading-interfaces (last visited Dec. 5, 2016).
CQG, "Revolutionize Your Trading with Our Market Profile® Chart and Studies," available at http://www.cqg.com/solutions/analytics/market-profile (last visited Dec. 5, 2016).
Web Archives, "Revolutionize Your Trading with Our Market Profile® Chart and Studies," available at https://web.archive.org/web/20150703190024/http:/www.cqg.com/solutions/analytics/features/market-profile (last visited Dec. 5, 2016).
CQG, "CQG Launches New Charting and Trade Execution Software," available at http://news.cqg.com/news/press-releases/2013/11/cqg-launches-new-charting-and-trade-execution-software (last visited Dec. 5, 2016).
Interactive Brokers, "Optimize your trading speed and efficiency with IB Trader Workstation," available at https://www.interactivebrokers.com/en/index.php?f=14099&ns=T (last visited Dec. 5, 2016).
Ninja Trader, "NinjaTrader® 6 Released with High-Performance System Development Capabilities," www.ninjatrader.com (Apr. 24, 2007).
Ninja Trader, "Trade Directly from Your Charts—Chart Trader!," available at http://ninjatrader.com/blogitrade-directly-charts-chart-trader/ (last visited Dec. 5, 2016).
NinjaTrader, Chart: The world's leading Futures, Forex and Stock markets, available at http://ninjatrader.com/Analyze (last visited Dec. 5, 2016).
TradeStation, TradeStation Platform, available at https://www.tradestation.com/trading-technology/tradestation-platform/execute/chart-trading (last visited Dec. 5, 2016).
TradeStation, "What 's New in TradeStation 9.1—Update 4," available at https://www.tradestation.com/trading-technology/whats-new/tradestation-9-1/update-4 (last visited Dec. 5, 2016).
TradeStation, "Stay Connected with WEB TRADING," available at https:I/www.tradestation.com/trading-technology/tradestation-webtrading (last visited Dec. 5, 2016).
Velez. O et al., "Tools and Tactics for the Master Day Trader: Battle-Tested Techniques for Day, Swing, and Position Traders," 293-299 McGraw-Hill, New York (2000).
CME Group, "About CME Group," http://www.cmegroup.com/company/ (last visited Feb. 8, 2016).
CME Group, "CME Group Overview," http://www.cmegroup.com/company/files/cmegroup-overview.pdf (last visited Feb. 8, 2016).
Petram, L.O., "The World's First Stock Exchange: How the Amsterdam Market for Dutch East India Company Shares Became a Modern Securities Market, 1602-1700," Introduction (2011) (Ph.D. Thesis, Instituut voor Cultuur en Geschiedenis) http://dare.uva.nl/document/2/85961.
Powers, Mark J., "Starting Out in Futures Trading," 324-325, McGraw-Hill, New York (e ed. 2001).
Parikh, S. et al., "Electronic futures markets versus floor trading: Implications for interface design," Paper presented at the CHI '95 Proceedings of the SIGCHI Conference on Human Factors in Computing Systems, 296-303 (1995).
Klein, A., "Wallstreet.Com: Fat Cat Investing at the Click of a Mouse; How Andy Klein and the Internet Can Give Everyone a Seat on the Exchange," 151-154 Henry Holt and Co., Inc. New York (1998).
Nye, A. (ed.). "The Definitive Guides to the X Window System, vol. Two, Xlib Reference Manual for Version 114," 538-539 O'Reilly & Associates, Inc. 6th printing, 1990.
Nison, S., "Japanese Candlestick Charting Techniques: A Contemporary Guide to the Ancient Investment Techniques of the Far East," New York Institute of Finance, New York (2nd ed. 2001).
Murphy, J., "Technical Analysis of the Financial Markets: A Comprehensive Guide to Trading Methods and Applications," New York Institute of Finance, New York (1999).
Hoyle, "The Game in Wall Street, and How to Play it Successfully," J.S. Ogilvie Publishing Co., New York, (1898).
Rudd, B. "Stock Patterns for Day Trading," Traders Press, Inc., Greenville, SC 2000 reprint (1998).
Oz, T., "Stock Trading Wizard: Advanced Short-Term Trading Strategies for Swing and Day Trading," Tony Oz Publications, Laguna Hills, CA (1999).
Wright. W., "Research Report: Information Animation Applications in the Capital Markets," in Readings in Information Visualization:

(56) References Cited

OTHER PUBLICATIONS

Using Vision to Think, (Stuart K. Card et al. eds.) 83, Morgan Kaufmann Publishers, Inc. (Stuart K. Card et al. eds.), San Francisco, 1999.
Robards, T., "Private Network is Established for Trading Institutional Stock," *N. Y. Times*, Mar. 6, 1969 at 57.
Thorp, W.A., "Technical Analysis Software," *Computerized Investing*, May/Jun. 2000 at 8.
Institution Decision, *Interactive Brokers LLC et al., v. Chart Trading Development, LLC*, CBM2016-00039 (Aug. 23, 2016).
Institution Decision, *Interactive Brokers LLC et al., v. Chart Trading Development, LLC*, CBM2016-00038 (Aug. 23, 2016).
Institution Decision, *CQG, Inc., et al., v. Chart Trading Development, LLC*, CBM2016-00047 (Sep. 9, 2016).
Institution Decision, *CQG, Inc., et al., v. Chart Trading Development, LLC*, CBM2016-00048 (Sep. 12, 2016).
Institution Decision, *CQG, Inc., et al., v. Chart Trading Development, LLC*, CBM2016-00046 (Sep. 13, 2016).
Final Written Decision, *Interactive Brokers LLC et al., v. Chart Trading Development, LLC*, CBM2016-00038 (Aug. 18, 2017).
Final Written Decision, *Interactive Brokers LLC et al., v. Chart Trading Development, LLC*, CBM2016-00039 (Aug. 18, 2017).
U.S. Appl. No. 60/171,442, filed Dec. 22, 1999, Kirwin, et al.
U.S. Appl. No. 60/251,790, filed Dec. 7, 2000, Gilbert.
MSDN, Microsoft Corporation, at http://msdn.microsoft.com/archive/default.asp?url=/archive/en-us/dnarvbtips/html/msdn_msdn72.asp (printed Nov. 2, 2004).
Caprini et al., "Data Acquisition General Control User Interface," Jun. 26, 1995, at http://citeseerist.psu.edu/617.html (printed Jul. 18, 2005).
"Two-sided Market"—Investopedia.com (printed Nov. 14, 2005).
"Market maker" and "make a market"—www.morganstanleyindividual.com/customerservice/dictionary (printed Nov. 14, 2005).
USPTO Office Action for U.S. Appl. No. 09/745,651, dated Sep. 19, 2007 (18 pages).
USPTO Office Action for U.S. Appl. No. 09/745,651, dated Apr. 16, 2007 (18 pages).
USPTO Office Action for U.S. Appl. No. 09/745,651, dated Sep. 12, 2006 (9 pages).
USPTO Office Action for U.S. Appl. No. 09/745,651, dated Feb. 10, 2006 (10 pages).
USPTO Office Action for U.S. Appl. No. 09/745,651, dated Aug. 16, 2005 (9 pages).
USPTO Office Action for U.S. Appl. No. 09/745,651, dated Dec. 15, 2004 (9 pages).
USPTO Office Action for U.S. Appl. No. 09/745,651, dated Jan. 28, 2004 (8 pages).
Uspto Office Action for Application No. 11/756,875, dated Apr. 15, 2008 (15 pp.).
USPTO Office Action for U.S. Appl. No. 11/756,875, dated Aug. 23, 2007 (12 pages).
USPTO Office Action for U.S. Appl. No. 11/756,964, dated Mar. 4, 2008 (15 pages).
USPTO Office Action for U.S. Appl. No. 11/756,964, dated Aug. 23, 2007 (12 pages).
USPTO Office Action for U.S. Appl. No. 09/995,698, dated Jan. 9, 2007 (7 pages).
USPTO Office Action for U.S. Appl. No. 09/995,698, dated Jun. 9, 2008 (8 pages).
USPTO Office Action for U.S. Appl. No. 09/982,709, dated May 21, 2007 (15 pages).
USPTO Office Action for U.S. Appl. No. 09/982,709, dated Apr. 27, 2007 (3 pages).
USPTO Office Action for U.S. Appl. No. 09/982,709, dated Feb. 23, 2007 (9 pages).
USPTO Office Action for U.S. Appl. No. 09/982,709, dated Jul. 28, 2006 (9 pages).
USPTO Office Action for U.S. Appl. No. 09/982,709, dated Nov. 30, 2005 (10 pages).
USPTO Office Action for U.S. Appl. No. 09/982,709, dated Apr. 1, 2005 (10 pages).
USPTO Office Action for U.S. Appl. No. 09/982,709, dated Jul. 28, 2004 (9 pages).
USPTO Office Action for U.S. Appl. No. 09/982,709, dated Jan. 20, 2004 (8 pages).
USPTO Office Action for U.S. Appl. No. 09/745,651, dated Oct. 31, 2008 (12 pages).
USPTO Office Action for U.S. Appl. No. 11/756,875, dated Oct. 28, 2008 (11 pages).
USPTO Office Action for U.S. Appl. No. 11/756,875, dated Jan. 26, 2009 (3 pages).
USPTO Office Action for U.S. Appl. No. 11/756,964, dated Oct. 28, 2008 (13 pages).
USPTO Office Action for U.S. Appl. No. 11/756,964, dated Jan. 26, 2009 (3 pages).
USPTO Office Action for U.S. Appl. No. 09/995,698, dated Apr. 1, 2009 (9 pages).
USPTO Office Action for U.S. Appl. No. 11/756,875, dated Jun. 10, 2009 (14 pages).
USPTO Office Action for U.S. Appl. No. 11/756,964, dated May 28, 2009 (13 pages).
USPTO Office Action for U.S. Appl. No. 09/745,651, dated Aug. 18, 2009 (13 pages).
Canadian Office Action for Application No. 2395379, dated Jun. 23, 2004 (5 pages).
Canadian Office Action for Application No. 2395379, dated May 27, 2005 (6 pages).
Canadian Office Action for Application No. 2395379, dated Nov. 20, 2006 (6 pages).
Canadian Office Action for Application No. 2395379, dated Oct. 15, 2007 (6 pages).
Canadian Office Action for Application No. 2395379, dated Mar. 23, 2009 (6 pages).
U.S. Appl. No. 60/171,442, filed Dec. 22, 1999 (17 pages).
U.S. Appl. No. 60/251,790, filed Dec. 7, 2000 (6 pages).
Notification of Transmittal of the International Search Report or the Declaration for International Application No. PCT/US00/34958, dated Aug. 27, 2001 (5 pages).
International Preliminary Examination Report for International Application No. PCT/US00/34958, dated Apr. 16, 2002 (4 pages).
International Search Report for International Application No. PCT/US01/47464, dated Apr. 1, 2002 (3 pages).
Written Opinion for International Application No. PCT/US01/47464, dated Jan. 20, 2003 (4 pages).
International Preliminary Examination Report for International Application No. PCT/US01/47464, dated Apr. 23, 2003 (3 pages).
International Search Report for International Application No. PCT/US02/33302, dated Jul. 21, 2003 (3 pages).
Written Opinion for International Application No. PCT/US02/33302, dated Sep. 30, 2003 (4 pages).
International Preliminary Examination Report for International Application No. PCT/US02/33302, dated Aug. 13, 2004 (3 pages).
UK Examination Report for Application No. GB 0216279.0, dated Jul. 10, 2003 (2 pages).
UK Examination Report for Application No. GB 0216279.0, dated Feb. 11, 2004 (2 pages).
UK Examination Report for Application No. GB 0216279.0, dated May 24, 2004 (1 page).
USPTO Examiner Interview Summary for U.S. Appl. No. 09/995,698, dated Sep. 11, 2009 (4 pages).
USPTO Office Action for U.S. Appl. No. 09/995,698, dated Dec. 24, 2009 (10 pages).
USPTO Examiner Interview Summary for U.S. Appl. No. 09/982,709, dated Jan. 23, 2006 (3 pages).
USPTO Examiner Interview Summary for U.S. Appl. No. 09/745,651, dated Aug. 16, 2005 (2 pages).
USPTO Examiner Interview Summary for U.S. Appl. No. 09/745,651, dated Nov. 1, 2007 (3 pages).
USPTO Examiner Interview Summary for U.S. Appl. No. 11/756,875, dated Jul. 10, 2008 (2 pages).
USPTO Examiner Interview Summary for U.S. Appl. No. 11/756,875, dated Nov. 2, 2009 (3 pages).

(56) References Cited

OTHER PUBLICATIONS

USPTO Examiner Interview Summary for U.S. Appl. No. 11/756,964, dated Nov. 2, 2009 (3 pages).
USPTO Examiner's Answer to Appeal Brief for U.S. Appl. No. 09/982,709, Aug. 19, 2008 (17 pages).
USPTO Examiner's Answer to Appeal Brief for U.S. Appl. No. 09/982,709, Nov. 18, 2008 (17 pages).
USPTO Examiner's Answer to Appeal Brief for U.S. Appl. No. 09/982,709, Feb. 24, 2009 (17 pages).
UK Examination Report for Application No. GB 0313935.9, dated Apr. 5, 2004 (3 pages).
Canadian Office Action for Application No. 2469510, dated Aug. 11, 2009 (4 pages).
USPTO Pre-Brief Appeal Conference Decision for U.S. Appl. No. 09/745,651, Dec. 31, 2009 (2 pages).
USPTO Examiner Interview Summary for U.S. Appl. No. 09/745,651, dated Mar. 15, 2010 (3 pages).
USPTO Examiner Interview Summary for U.S. Appl. No. 11/756,875, dated Mar. 16, 2010 (3 pages).
USPTO Examiner Interview Summary for U.S. Appl. No. 11/756,964, dated Mar. 16, 2010 (3 pages).
USPTO Office Action and Examiner Interview Summary for U.S. Appl. No. 11/756,964, dated Apr. 15, 2010 (23 pages).
BPAI Order Returning Undocketed Appeal to the Examiner for U.S. Appl. No. 09/982709, Jun. 9, 2009 (3 pages).
USPTO Advisory Action for U.S. Appl. No. 09/982709, dated Jul. 20, 2009 (3 pages).
BPAI Administrative Remand to Examiner for U.S. Appl. No. 09/982709, Apr. 21, 2010 (3 pages).
Canadian Examiner's Report for Application No. 2395379, dated Apr. 29, 2010 (8 pages).
USPTO Notice of Allowance and Fees Due and Examiner Interview Summary for U.S. Appl. No. 09/745,651, dated Jun. 9, 2010 (19 pages).
USPTO Notice of Allowance and Fees Due and Examiner Interview Summary for U.S. Appl. No. 11/756,875, dated Jun. 22, 2010 (9 pages).
Hsu, Y. et al. An Approach for Designing Composite Metaphors for User Interfaces. Behavior & Information Technology. vol. 26, No. 3. May-Jun. 2007. pp. 209-220.
Jayapandian, Magesh. Automated Creation of Database Forms. Proquest Dissertations and Theses 2009. Section 0127, Part 0984. [Ph. D. dissertation]. United States—Michigan: University of Michigan. 2009. Publication No. AAT 3354270.
MacNaughton, David et al. Design and Optimization Aids for Composite Control Charts. Quality Engineering © Taylor & Francis Group, LLC. 2009.
USPTO Office Action for U.S. Appl. No. 09/982,709, dated Jul. 8, 2010 (7 pages).
USPTO Examiner Interview Summary for U.S. Appl. No. 09/995,698, dated Jun. 24, 2010 (4 pages).
USPTO Notice of Allowance and Fees Due for U.S. Appl. No. 09/745,651, dated Aug. 4, 2010 (3 pages).
USPTO Notice of Allowance and Fees Due for U.S. Appl. No. 11/756,875, dated Aug. 2, 2010 (3 pages).
Trading Technologies document, "Trading System Confidential User Documentation," p. 32, allegedly 1998 (one page).
U.S. Appl. No. 12/789,006, filed May 27, 2010, Inventors: Glenn D. Kirwin, et al., entitled "Systems and Methods for Providing a Trading Interface" (48 pages).
U.S. Appl. No. 12/789,122, filed May 27, 2010, Inventors: Glenn D. Kirwin, et al., entitled "Systems and Methods for Providing a Trading Interface" (48 pages).
USPTO Petition Decision for U.S. Appl. No. 09/745,651, Sep. 1, 2010 (1 page).
USPTO Petition Decision for U.S. Appl. No. 11/756,875, Aug. 31, 2010 (1 page).
USPTO Notice of Withdrawal from Issue for U.S. Appl. No. 11/756,875, dated Sep. 1, 2010 (1 pages).
Notice of Opposition filed on Jan. 15, 1998 against European Application No. EP 93904823.7 with Annex A3, document dated Jan. 16, 1998 (108 pages).
"Money Match Functional Specification," The Sequor Group, Inc. Software Services, Version 1, Aug. 1990 (87 pages).
USPTO Notice of Allowance and Fees Due for U.S. Appl. No. 09/745,651, dated Sep. 30, 2010 (6 pages).
USPTO Notice of Allowance and Fees Due for U.S. Appl. No. 11/756,875, dated Sep. 29, 2010 (6 pages).
USPTO Office Action for U.S. Appl. No. 12/789,006, dated Sep. 30, 2010 (12 pages).
USPTO Supplemental Notice of Allowance and Fees Due for U.S. Appl. No. 09/745,651, dated Oct. 26, 2010 (3 pages).
USPTO Notice of Allowability for U.S. Appl. No. 09/745,651, dated Nov. 9, 2010 (4 pages).
USPTO Notice of Allowability for U.S. Appl. No. 11/756,875, dated Nov. 9, 2010 (4 pages).
USPTO Examiner Interview Summary for U.S. Appl. No. 11/756,964, dated Nov. 3, 2010 (3 pages).
USPTO Office Action for U.S. Appl. No. 11/756,964, dated Nov. 15, 2010 (18 pages).
USPTO Office Action for U.S. Appl. No. 12/789,122, dated Nov. 26, 2010 (12 pages).
USPTO Notice of Allowance and Fees Due for U.S. Appl. No. 09/995,698, dated Jan. 10, 2011 (4 pages).
USPTO Office Action for U.S. Appl. No. 09/982,709, dated Apr. 1, 2011 (14 pages).
USPTO Notice of Allowance and Fees Due for U.S. Appl. No. 11/756,964, dated Jun. 17, 2011 (9 pages).
USPTO Notice of Allowance and Fees Due and Examiner Interview Summary for U.S. Appl. No. 12/789,006, dated Jun. 28, 2011 (19 pages).
USPTO Notice of Allowance and Fees Due for U.S. Appl. No. 09/995,698, dated Jun. 3, 2011 (5 pages).
USPTO Office Action for U.S. Appl. No. 12/789,122, dated Aug. 23, 2011 (12 pages).
USPTO Office Action for U.S. Appl. No. 12/789,122, dated May 15, 2013 (12 pages).
USPTO Office Action for U.S. Appl. No. 12/789,122, dated Dec. 26, 2013 (12 pages).
USPTO Office Action for U.S. Appl. No. 12/789,122, dated Sep. 25, 2014 (13 pages).
Canadian Office Action for Application No. 2469510, dated Jul. 24, 2013 (4 pages).
Canadian Notice of Allowance for Application No. 2469510, dated Sep. 10, 2014 (2 pages).
USPTO Office Action for U.S. Appl. No. 09/982,709, dated Jan. 24, 2012 (18 pages).
USPTO Notice of Panel Decision for U.S. Appl. No. 09/982,709, Sep. 13, 2012 (2 pages).
USPTO Notice of Panel Decision for U.S. Appl. No. 09/982,709, Dec. 5, 2013 (22 pages).
USPTO Notice of Allowance and Fees Due for U.S. Appl. No. 09/995,698, dated Oct. 15, 2013 (7 pages).
Canadian Patent Appeal Board Notice for Application No. 2395379, Apr. 6, 2016 (6 pages).

* cited by examiner

SYSTEMS AND METHODS FOR PROVIDING A TRADING INTERFACE

CROSS REFERENCE TO RELATED APPLICATIONS

This application is a continuation of U.S. patent application Ser. No. 12/789,122 filed May 27, 2010; and is a continuation of U.S. patent application Ser. No. 12/789,006 filed on May 27, 2010 (now U.S. Pat. No. 8,060,435 issued on Nov. 15, 2011); and is a continuation of U.S. patent application Ser. No. 11/756,964 filed on Jun. 1, 2007 (now U.S. Pat. No. 8,041,626 issued on Oct. 18, 2011); and is a continuation of U.S. patent application Ser. No. 11/756,875 filed on Jun. 1, 2007 (now U.S. Pat. No. 7,890,416 issued on Feb. 15, 2011); which is a continuation of U.S. patent application Ser. No. 09/745,651 filed on Dec. 22, 2000 (now U.S. Pat. No. 7,991,679 issued on Aug. 2, 2011), which claims the benefit of U.S. Provisional Patent Application Ser. No. 60/171,442, filed Dec. 22, 1999, which are hereby incorporated by reference herein in their entirety.

BACKGROUND OF THE INVENTION

This invention relates to systems and methods for providing a trading interface. More particularly, this invention provides a trading interface that allows a trader to use a pointing device such as a mouse to execute a trade quickly and accurately.

As electronic trading becomes more popular, an increasing number of traders are in need of new systems and methods to enter trade commands in a quick, efficient, and accurate manner. In one method of electronic trading, bids and offers are submitted by traders to a trading system, those bids and offers are then displayed by the trading system to other traders, and the other traders may then respond to the bids and offers by submitting sell (or hit) or buy (or lift or take) commands to the system.

Many implementations of this method of electronic trading, while generally accurate, lack in desired speed mainly because traders are forced to use both a standard PC keyboard and a mouse to execute a trade. This dual process causes much delay for traders because the traders must follow several steps prior to accomplishing a trade. For example, many traders using typical trading systems are required to (1) click on an issue of choice, (2) click on a buy or sell button, and (3) use the keyboard to enter a price and size for the trade.

The benefit of using a keyboard to execute a trade is that a trader may execute a trade with a great deal more speed than with a mouse. Specifically, with a keyboard, the trader may use all ten fingers, while with a mouse the trader may use two fingers at most.

Despite the drawbacks associated with using a mouse, many traders continue to use a mouse because it is considered easy to use, and thus traders feel that they are less likely to make unwarranted trading mistakes with a mouse. Because trading professionals frequently have large amounts of money at stake when trading, many professionals prefer to forgo speed and efficiency for peace of mind.

While mouse-based interfaces have existed for years, these interfaces have put traders using them at a disadvantage when competing with full-time keyboard traders. One reason the existing mouse-based interfaces place those traders at a disadvantage is that those traders are forced to physically move a mouse pointer from an indicator for a desired instrument, that is at some given point on a trading screen, to some other point on the screen where bidding/offering and buying/selling commands can be entered. This approach is very time consuming.

Thus, it is an object of the invention to provide systems and methods that enable a trader to execute trades quickly, efficiently, and accurately using a pointing device interface.

SUMMARY OF THE INVENTION

In accordance with this and other objects of the invention, systems and methods provide configurable trading interfaces that allow a trader to quickly and easily submit trading commands to a trading system. More particularly, in accordance with this invention, the trader can use various trading interfaces to initiate trading commands, configure various display features and default command settings, and control a level of command entry verification that is provided to protect against inadvertent entry of incorrect trading commands.

In order to initiate a trading command using the present invention, a trader may enter the command using a command-line interface, click on a component of a bid and offer in a market cell, enter the command using a graphical interface, or may click on a piece of data in a data window. After initiating a command from a command-line interface, a market cell, or a data window, the present invention may verify the entry by presenting a graphical interface. This interface may be the same graphical interface that may be used to enter a trading command. In addition to displaying the graphical interface, a mouse pointer may be redirected to a portion of the graphical interface to speed up entry of the trading command. After initiating the command, but before completing the command, a trader may then alter the parameters of the command either to complete entry of the parameters or to correct one or more incorrect entries.

To enable customization of the graphical interface to a trader's preferences, settings controls are provided. These controls may enable the trader to set a preferred order type, cause the graphical interface to automatically close after a trade command has been entered or canceled, display a history of trade commands, set the trade item type, set how bid and offer information is displayed, set how default prices, sizes, and limits, and set position and color preferences.

As will be apparent upon reading the Detailed Description of the Preferred Embodiments, various features of the present invention may be implemented with any type of trading system for the trading of any type of item. For example, as illustrated herein, the invention may be used with a bid/offer, buy/sell trading system for trading of financial instruments, such a bonds. Likewise, as another example, the invention may be used with a matching system, wherein bids and offers are submitted by various traders and matched, for the trading of other items, such a materials and supplies for manufacturing.

BRIEF DESCRIPTION OF THE INVENTION

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
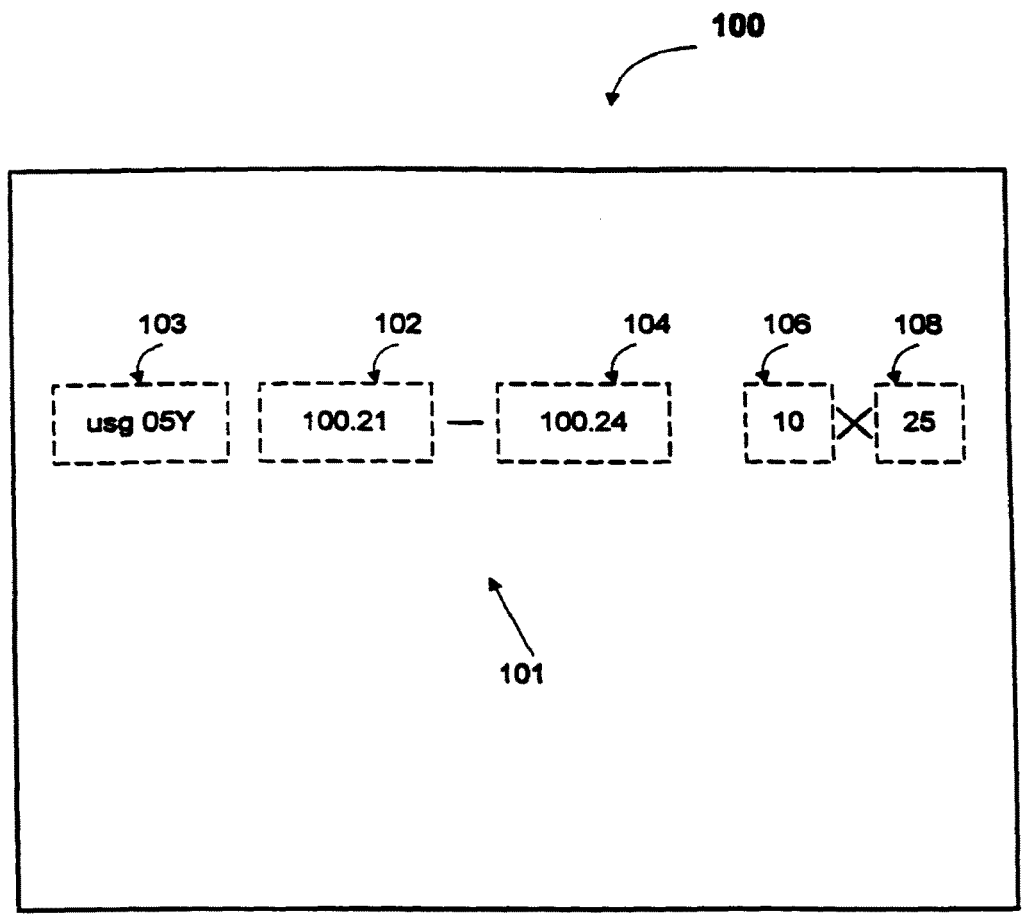
FIG. 1 is an illustration of a market cell that may be generated in accordance with certain embodiments of the present invention.

Turning to FIGS. 1-4, examples of screen displays that may be presented in certain embodiments of the present invention are illustrated. FIG. 1 shows a market cell 100 that may be used to display one or more bid and/or one or more offer 101 for an item to be traded. As illustrated, bid and offer 101 indicates a price 102 which a buyer is willing to pay for a selected item 103 at a given size 106 (i.e., a number of the item) and a price 104 which a seller is willing to accept for selected item 103 at a given size 108.

Each component of a market shown in market cell 100 may be marked with a color, or in any other suitable manner, to indicate features of that component. For example, as shown in FIG. 1, the entire area of fields 102, 103, 104, 106, and 108 may be colored, or only the symbols in those fields may be colored, to assign a meaning to each field. As a further example, a specific color may be assigned to field 102 to indicate that a price in the field is a bid price. Preferably, a trader is able to specify the color assigned to each component of a trade. The fields, or symbols contained therein, may be continuously colored or may be shown in a chosen color when a mouse pointer is passed over each field or used to click on each field.

In order to bid for, offer to sell, buy, and/or sell an item through market cell 100, a trader may submit a trading command indicating the action to be taken using various approaches. For example, in preferred embodiments, a trader may submit the trading command using a command-line interface, by clicking on components of bid and offer 101, and/or using a graphical interface.

When using a command-line interface, a trading command may be entered in any non-graphical interface desired. For example, a trader may submit a trading command by pressing buttons on a keyboard. Likewise, a trader could use a voice recognition system to enter commands verbally, or a trader could use some combination of voice recognition, keyboard, and pointing device.

A trader may also indicate a desire to bid, offer, buy, and/or sell an item by clicking on different portions of a bid and offer 101 for that item in market cell 100. For example, if the trader clicks on bid price 102, the trader may indicate to submit a bid for the item. If the trader clicks on offer price 104, the trader may indicate to submit an offer for the item. If the trader clicks on bid size 106, the trader may submit a command to sell the item. And, if the trader clicks on offer size 108, the trader may submit a command to buy the item.

Preferred embodiments of the present invention may allow a trader to use different levels of mouse button entries to initiate a trading command. That is, for flexibility, this invention may allow a trader to determine how many clicks on components of bid or offer 101 using a button of a mouse are required before the trader either bids for, offers to sell, buys, and/or sells an item corresponding to the market cell. For example, for maximum speed and slightly more risk, the trader may choose that a market be acted upon after a single click on a component of bid or offer 101. Likewise, a trader may choose to use a double click on a market before it is acted upon.

Figure 2:
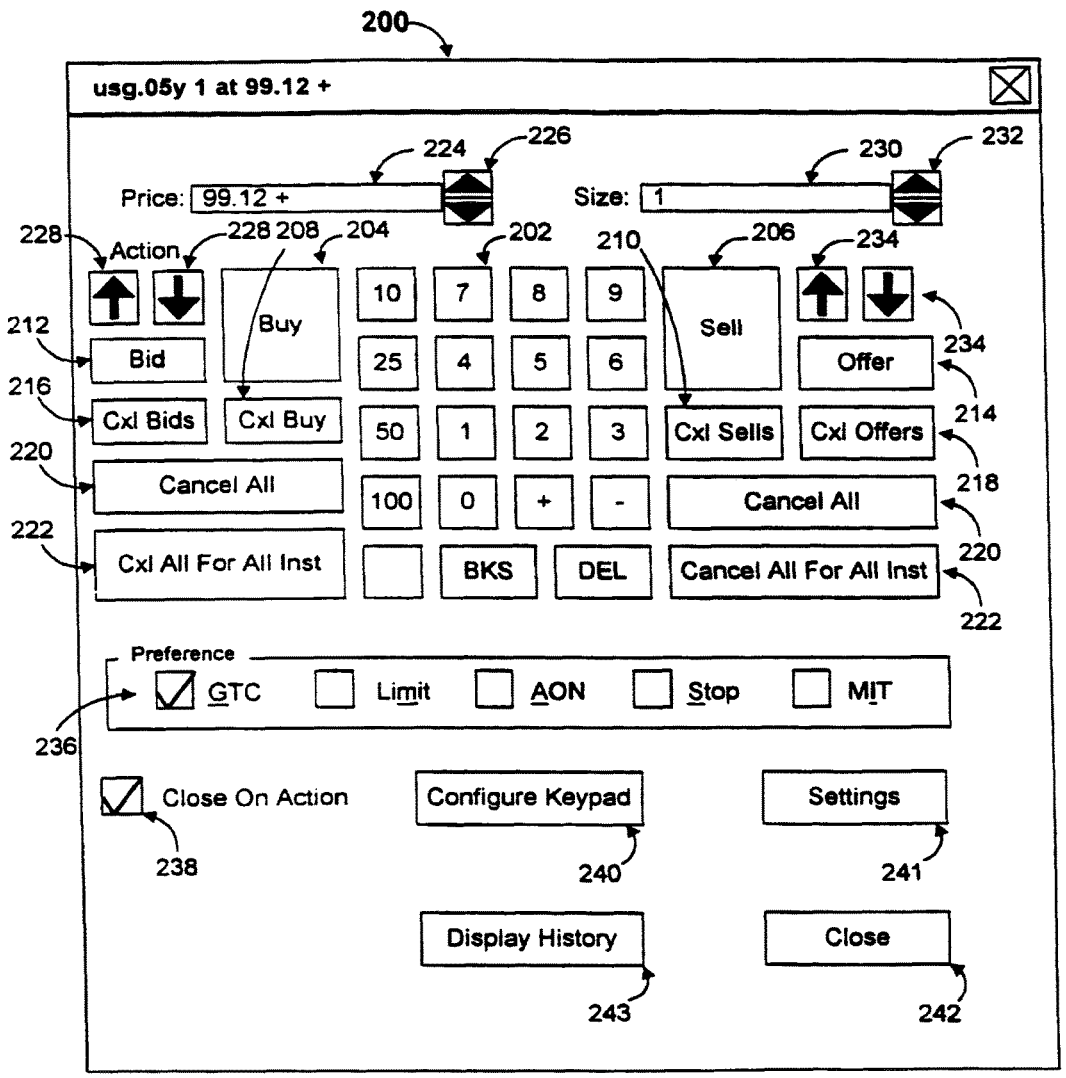
FIG. 2 is an illustration of a dialog window that may be generated in accordance with certain embodiments of the present invention.

FIG. 2 illustrates one embodiment of a graphical interface for submitting trading commands. As shown, the graphical interface comprises a dialog window 200 with various buttons and entry fields 202-242. Using these buttons and entry fields, a trader may submit a bid command, an offer command, a buy command, or a sell command for an item corresponding to a market cell 100. Preferably, each traded item uses a unique dialog window 200. Dialog window 200 may be opened automatically and/or manually before, during, and/or after a trade, and may allow a trader to submit a trade command at any time. The dialog window may be repositioned on a trader's display and/or fixed in place. The trader, preferably, will keep the window associated with a particular instrument below the market cell 100 for the same tradable item. The number of dialog windows 200 that can be kept open at any one time is preferably unlimited.

As shown in FIG. 2, dialog window 200 may comprise a variety of on-screen buttons and entry fields. Generally, a button, as displayed in box 200, may be "pushed" by placing a pointing device's pointer over the button and pressing a switch on the pointing device, as is commonly known in the art. At the center of window 200, a numeric keypad 202 may be displayed. The numeric keypad 202 may provide buttons for numbers zero through nine, and may contain buttons for numbers ten, twenty-five, fifty, and one hundred or any other suitable or desirable values. The numeric keypad 202 may also contain a plus button ("+"), a minus button ("−"), a decimal point button ("."), a backspace button ("BKS"), and a delete button ("DEL").

In addition to displaying a numeric keypad as described above, dialog window 200 may also provide a user with a buy button 204, a sell button 206, a cancel buys button 208, a cancel sells button 210, a bid button 212, an offer button 214, a cancel bids button 216, a cancel offers button 218, cancel all buttons 220, cancel all for all instruments button 222, a price entry field 224, price up and down buttons 226, bid price up and down buttons 228, offer price up and down buttons 234, a size entry field 230, and size up and down buttons 232. Finally, dialog window 200 may contain a preference field 236 that allows a user to specify preferred types of orders, a close-on-action box 238 that causes dialog window 200 to be automatically closed after specified actions are performed, a configure keypad button 240 that allows a user to arrange the keypad for dialog window 200, a close button 242 that closes the dialog window 200 on demand, a settings button 241, and a display history button 243 that causes a history list of order entries to be display when pressed.

Preference field 236 may be used to indicate the user's preferred trade type and may allow the user to select any type of trade that a particular exchange or trading system supports. Although FIG. 2 provides specific examples of trade types (e.g., good-till-canceled (GTC), limit, all-or-none (AON), stop, and market-if-touched (MIT)), the invention may be implemented with any type of trade.

Configure keypad button 240 may allow a trader to arrange buttons appearing in dialog window 200 to be anywhere a trader prefers by first pressing the configure keypad button 240, by then dragging the buttons to new positions, and finally by clicking on button 240 again. Also, the configuration or re-configuration of buttons can change the function of those buttons depending on the type of trading desired or what type of item is being traded.

Although any of the approaches described herein to submitting a trading command may be used independently of the others, two or more approaches may also be used in conjunction. For example, when using a command-line interface, an entry verification feature of the present invention may display a graphical interface to confirm a trader's intentions after a command-line trade command has been entered. Similarly, as another example, after clicking on a component of a bid and offer 101 in a market cell 100, an entry verification feature of the present invention may display a graphical interface to a trader to allow the trader to alter and/or confirm the command being submitted.

To speed entry of a trading command when using various approaches to submit a trading command in conjunction, the present invention preferably includes a pointer warping feature that redirects the focus of the pointing device pointer to another location of the trader's display. In accordance with this feature, for example, when a trader clicks on a bid price 102 ($100.21 as depicted in FIG. 1) in a market cell 100, a dialog window 100 may pop-up (if not already open), and a pointer that is being used, by the trader may be immediately redirected to a bid button 212 to save the trader the time of repositioning the pointer to that location. Once in the new location, the trader may then use the pointer to confirm and/or modify the trade command and then submit the trade command using bid button 212. Although this feature of the present invention is described in connection with a pointing device pointer, this feature may be implemented using any suitable graphical interface pointer, cursor, or similar object.

Assume instead that, in the previous example, the trader wants to increase bid price 102 to $100.22. When the appropriate trade submission approaches are used in conjunction, the trader may click anywhere on the displayed bid and offer 101, and thereby cause dialog window 200 to appear. At this point, the trader may press bid button 212 once and thereby cause bid price 102 ($100.21 as illustrated in FIG. 1) to appear in price entry field 224. To increase bid price 102 from $100.21 to $100.22, the trader may then press price up button 226, or press bid price up button 228. When dealing with an offer, the trader may press offer price up button 226 or press price up button 234. Because time is typically of the essence, the trader will preferably use bid price up button 228 or offer price up button 234 because it is closer to bid button 212. Finally, to submit the bid, the trader may click on bid button 212 again to submit the bid. Alternatively, if the trader didn't want to alter the price, the trader could have double clicked immediately on bid button 212.

After any trade command is entered by pressing bid button 212, offer button 214, buy button 204, or sell button 206, the mouse pointer may then be maintained in its position above the just-pushed button in case the trader wants to repeat entry of the same trade command shortly thereafter.

As indicated above, a trader may never need to type a full price in field 102. Instead, a trader may configure the dialog window to automatically post in price entry field 224 either the current bid or offer price or a pre-programmed-increment-better bid or offer price of a bid or offer that the trader clicks on. Alternatively, a trader may point to each individual number or quantity (i.e., 0-9, 10, 25, 50, or 100) in keypad 202 and, in effect, input the desired price (or size) using a mouse.

In order to enter a size for a bid, offer, buy, or sell command, a trader may either choose to use a pre-programmed default size or adjust the size of a trade in size entry field 230. When the trader is either bidding or offering, size entry field 230 preferably will initially always show a pre-set size amount as configured by the trader. To increase or decrease the size, the trader may either push the size up or size down buttons 232, or delete the size and enter a new size using the keypad 202.

Preferably, by default, size entry field 230 is filled with a selected bid or offer's size and highlighted when dialog window 200 is opened in response to a trader clicking on the selected bid or offer size. By highlighting the size entry field 230, a trader may change the size by simply pushing any of the buttons on keypad 202 without first highlighting and/or deleting numbers in that field. Once a desired size is entered, a trader may then push sell button 206 or buy button 204 and submit an order to sell or buy the size appearing in size entry field 224.

Another way for a trader to bid is to choose an instrument and a size and then press bid button 212 without designating a price. By entering a bid in this manner, the trader simply joins the best bid that appears on the trader's screen for that instrument. Although this approach to entering a bid is extremely easy and fast, a trader is risking that in the moment just prior to pressing bid button 212, the bid price appearing on the screen may change and thus force a trader to use the new price. Should this occur, a trader may press the cancel bids button 216 and re-enter a desired bid using the method described above.

As mentioned above, an entry verification feature of the present invention may be used in conjunction with a command-line interface or a click on bid or offer interface to cause a graphical interface to be presented after a trader submits a command-line trade command or a clicks on a component of a bid or offer. For example, if using a command-line interface, a trader submits a command to bid at a certain price for a certain size, a dialog window 200 may automatically appear (if not already shown), price and size fields 224 and 230 may be populated with the certain price and the certain size, and the pointer may be warped to just above bid button 212. The trader can then press bid button 212 to confirm the command or alter the price and/or size as described above.

Although the illustrations above are discussed in connection with bidding for and buying of an item, it should be obvious to those of ordinary skill in the art that the same features of the present invention are available in the offering for and selling of an item. Offer and sell buttons may be used instead of bid and buy buttons to offer and sell, respectively, an item.

Figure 3:
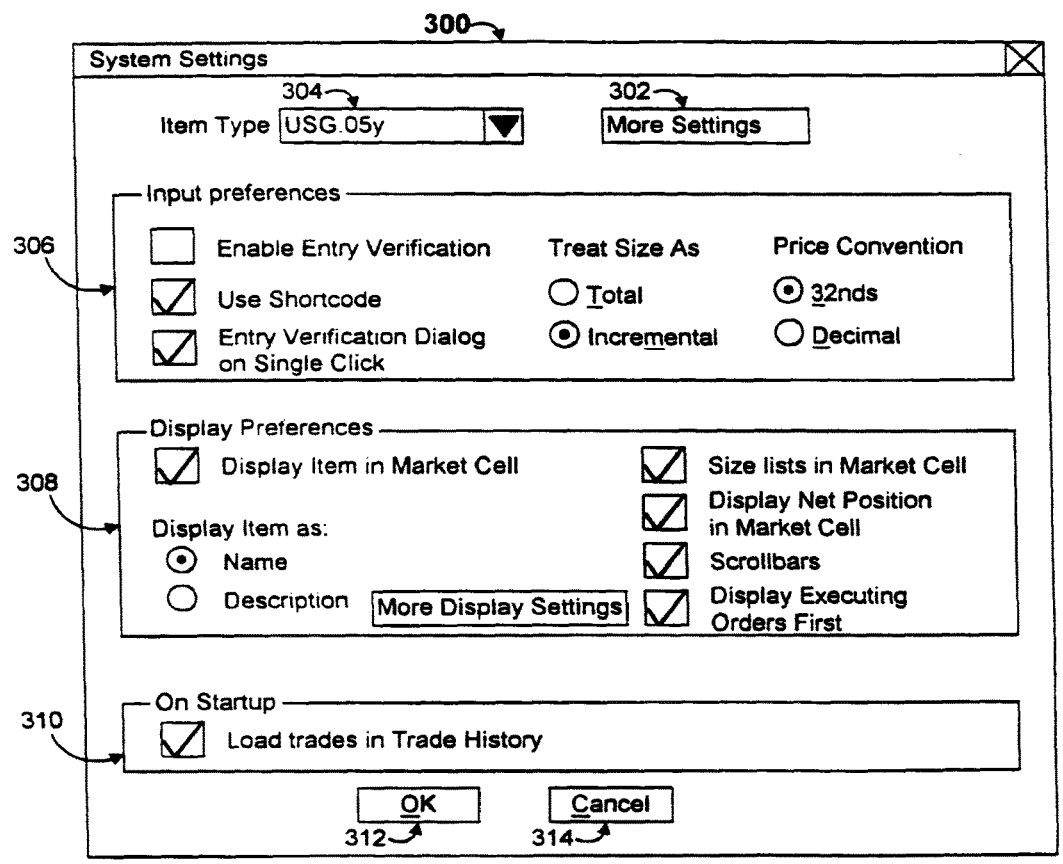
FIGS. 3 and 4 are illustrations of system settings windows that may be generated in accordance with certain embodiments of the present invention.

FIG. 3 shows a system settings screen 300 that may be presented upon a trader pressing "settings" button 241 in dialog window 200 or a corresponding function key. In order for preferred embodiments of the present invention to operate ideally for a trader, the trader may have to configure at least one setting in systems settings screen 300. Systems setting screen 300 may comprise a "more settings" button 302, an item type selection field 304, input, preference settings 306, display preference settings 308, an on-startup preference setting 310, an "OK" button 312, and a "Cancel" button 314.

Within the item type selection field 304, a trader may select a preferred item type by indicating a type of item to be traded. For example, as illustrated in FIG. 3, item type selection field 304 indicates that the item to be traded is a 5 year U.S. Treasury bond. Other available item types, including financial instruments, bets or wagering instruments, or other tradable items, however, may be displayed and selected using a drop-down list associated with item type selection field 304.

Input preference settings 306 may allow a trader to enable or disable the entry verification feature, use short codes to facilitate futures contracts transactions (when futures contracts are a tradable item), open dialog window 200 when a single click is entered on a bid or offer, select whether an entered size is treated as a total size or an incremental size, and select whether a price is displayed in 32nds format or decimal format.

Display preference settings 308 may enable a trader to specify how bids and offers are displayed. More particularly, preference settings 308 may allow a trader to indicate whether to display a current instrument in a market cell 100, whether to display the current instrument by name or description, whether to list sizes for various bids and offers in the market cell, whether to display the net position in the market cell, whether to display scroll bars for the market cell, whether to display executing orders for the instrument first in the market cell, and whether to allow the trader to configure other display preferences by pressing "more display settings" buttons. An on-startup preference setting 310 may enable a trader to indicate whether trades from a previous trading session are loaded into the trade history upon start-up of dialog window 200. Finally, an "OK" button 312 and a "Cancel" button 314 may be provided to enable a trader to indicate whether to accept recently inputted changes or cancel the changes, respectively.

Figure 4:
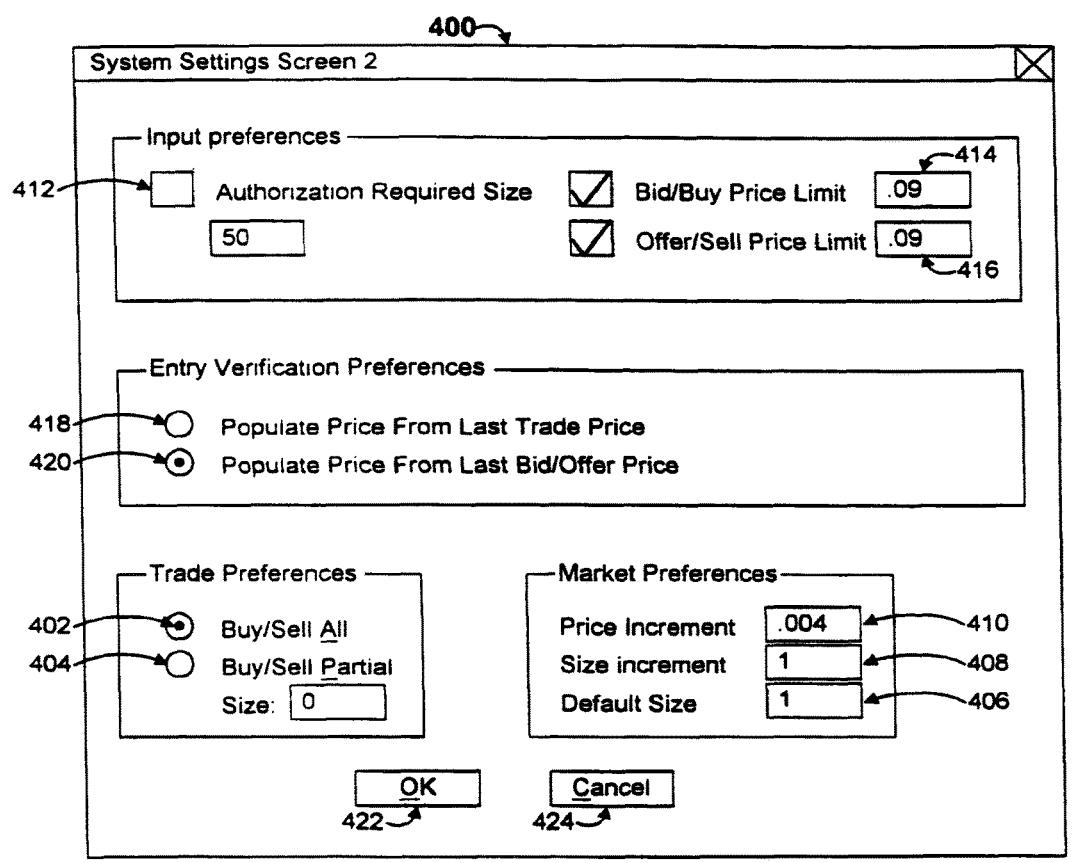

If, from systems settings screen 300, a trader presses "more settings" button 302, a second settings screen 400 may be displayed as shown in FIG. 4. As can be seen, second settings screen 400 may provide the trader with an ability to specify, using trade preferences, whether to buy or sell all 402 of the size of an offer or bid as displayed, or, regardless of the displayed size, to buy or sell a certain pre-designated size (Buy/Sell Partial Size 404) when clicking on a security in a market cell. Likewise, second settings screen 400 also permits the trader to specify a default size 406 for bids and offers, a default size increment 408 for bids and offers that will be used for size up/down button depressions, and a default price increment 410 for bids and offers that will be used for price up/down button depressions.

Second settings screen 400 also allows the trader to specify limits to prevent accidental entry of a command for a price or size that is outside a reasonably expected range. By selecting box 412, the trader may enable a confirmation alert that prompts the trader for authorization to submit a command for a size larger than the limit (previously selected by the trader or set by the system based on the trader's previous trading history and the traded item's overall market history). By selecting and setting a bid/buy price limit 414 and an offer/sell price limit 416, the trader may also specify a maximum bid/buy price and a minimum offer/sell price.

Finally, as shown in second settings screen 400, the trader may select whether to automatically populate a bid/offer with a last trade price or a last bid/offer price using entry verification preferences 418 and 420.

Once a trader has completed setting the preferences, a trader may submit the preferences by pressing an "OK" button 422 or cancel the preferences by pressing a "Cancel" button 424.

If a trader presses the "more display settings" button in display preferences 308 of settings screen 300 of FIG. 3, display settings screen 500 may appear to allow the trader to specify screen colors, window positioning, and other display functions. By selecting "ON" button 502, a trader may choose to highlight a particular field of the dialog window whenever the pointing device passes over that field. Thus, for example, when a user passes a pointer over the price field, the field will automatically be highlighted while the system awaits user input into that field. The trader may turn this function off by pushing "OFF" button 804.

In addition to dragging the window and placing it in a preferred area on the screen, a user may set the default position of market cell 100 and dialog window by using pull-down menus 506 and 508. Specifically, the position of the market cell may be selected using market cell menu 506. Menu 506 may allow a trader to drag the main trading window to any position on the screen and thereafter use that position as the default position for the main trading window, to select a quadrant of the screen, or to select any other desired portion of the screen. Dialog window menu 508 may allow the trader to select the position of the dialog window using menu options similar to those described for market cell menu 506.

Display settings screen 500 also allows a user to select the color or other characteristic (e.g., blinking text, font size, etc.) of the bid or offer. A trader may select bid menu 510 to select a color or other display characteristic for the bid. Offer menu 512 may be selected to select the color or other display characteristics for an offer. Similar options may be implemented to allow a trader to select the color and other display factors for all parameters of a trade.

Finally, "OK" button 514 and "Cancel" button 516 may be used to either confirm changes or cancel the changes selected on display settings screen 500, respectively.

Although illustrated in a particular fashion for trading particular types of items, the present invention, and thus the interfaces shown in FIGS. 1-5, may be altered to facilitate trading of any type of tradable items.

Figure 5:
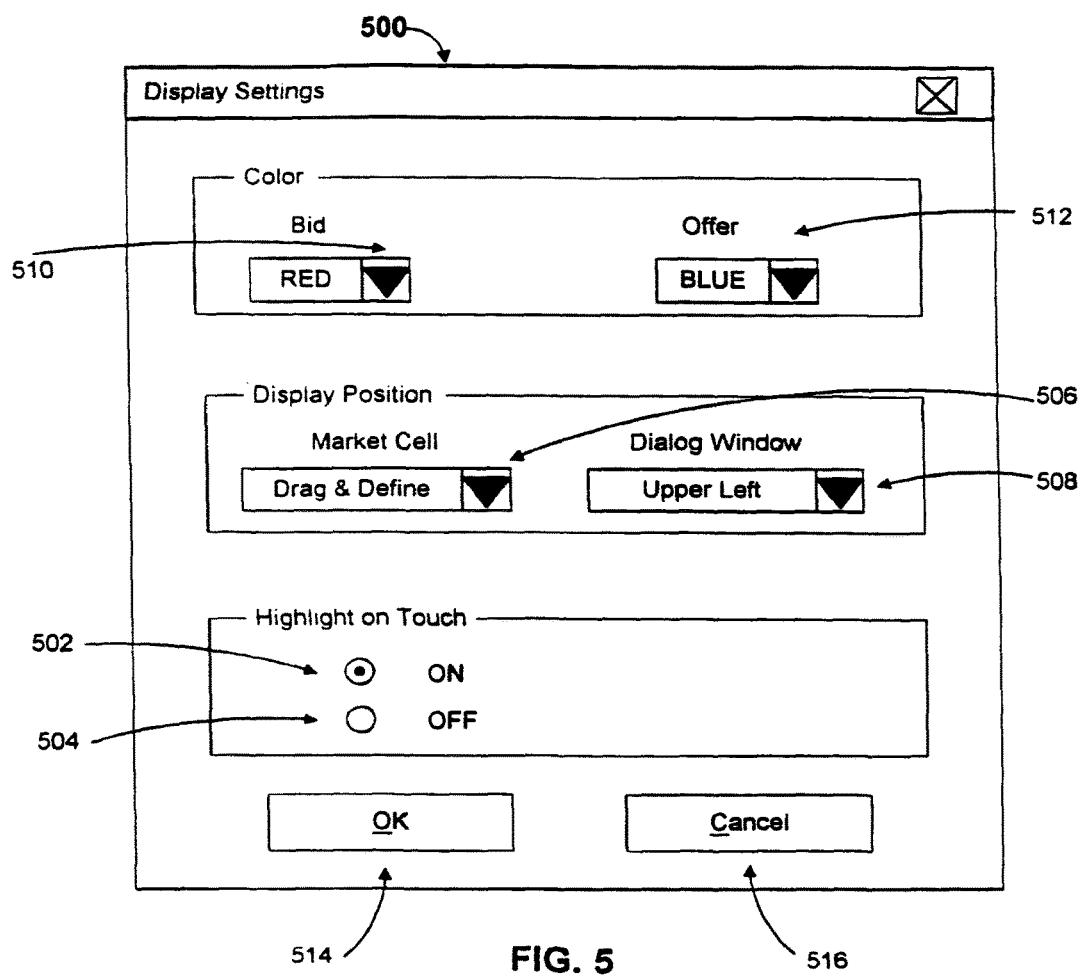
FIG. 5 is an illustration of a display settings window that may be generated in accordance with certain embodiments of the present invention.
Figure 6A:
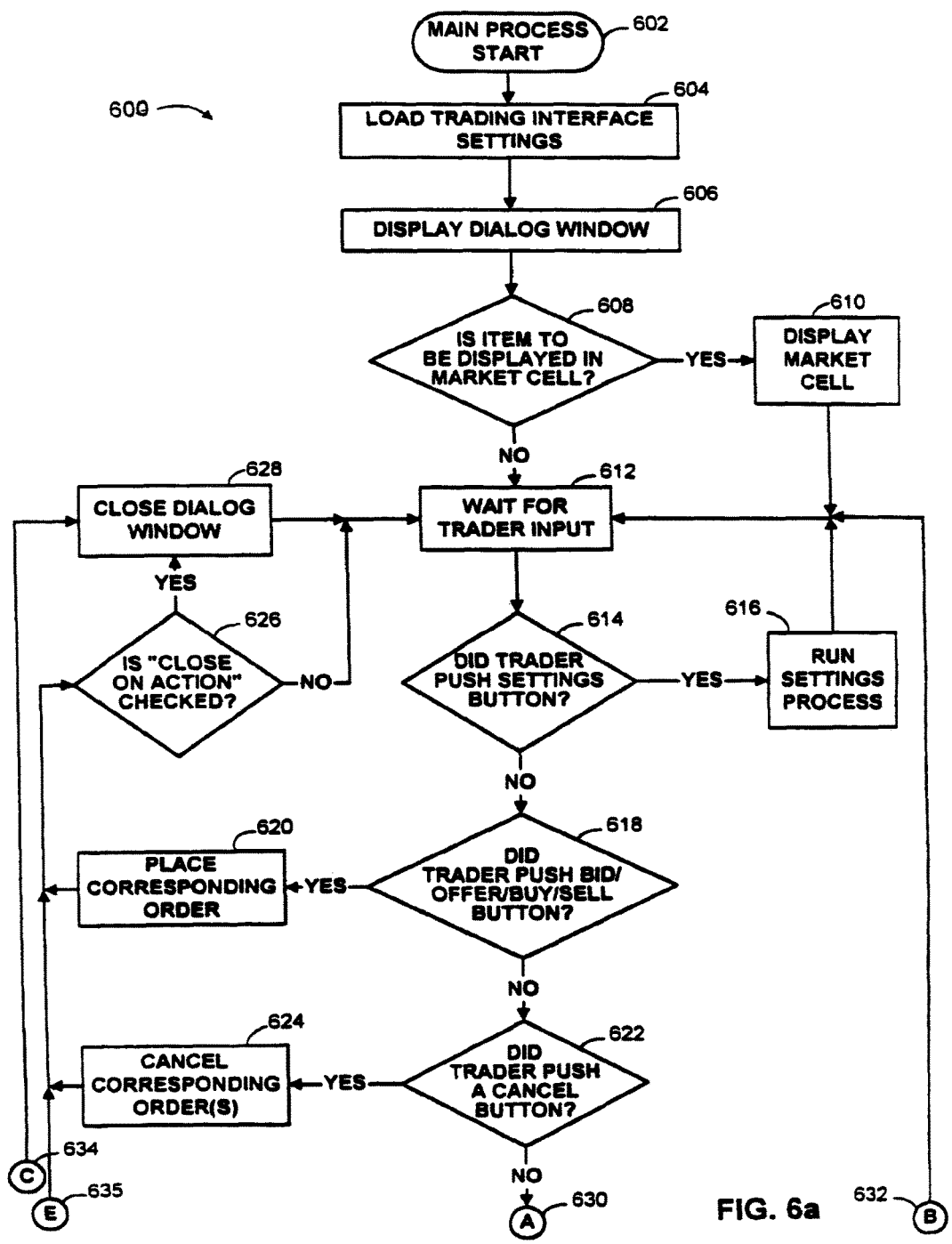
FIG. 6 is a flow diagram of a main process that may be used to perform the functions illustrated in FIGS. 1 and 2 in accordance with certain embodiments of the present invention.
Figure 6B:
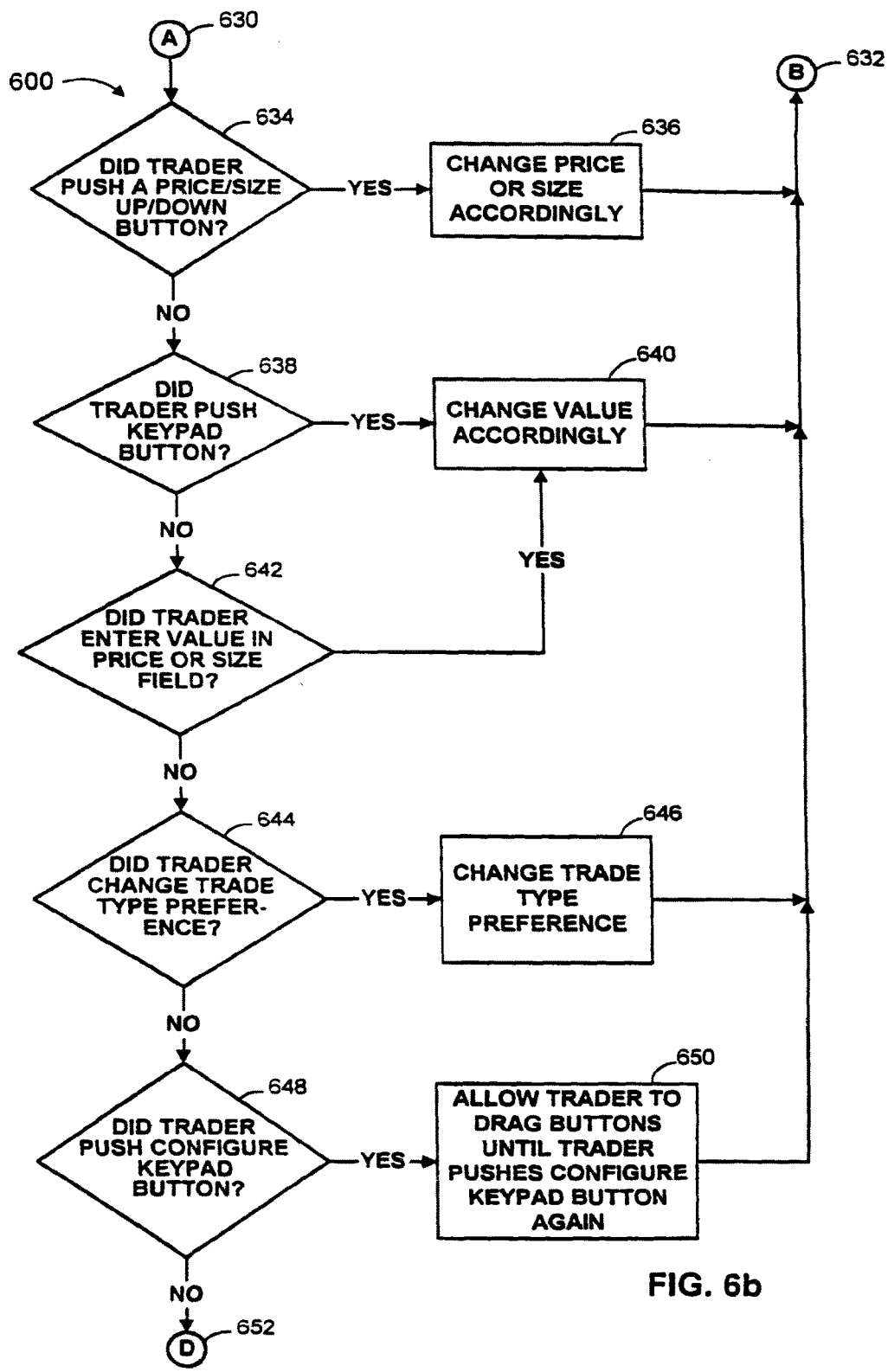
Figure 6C:
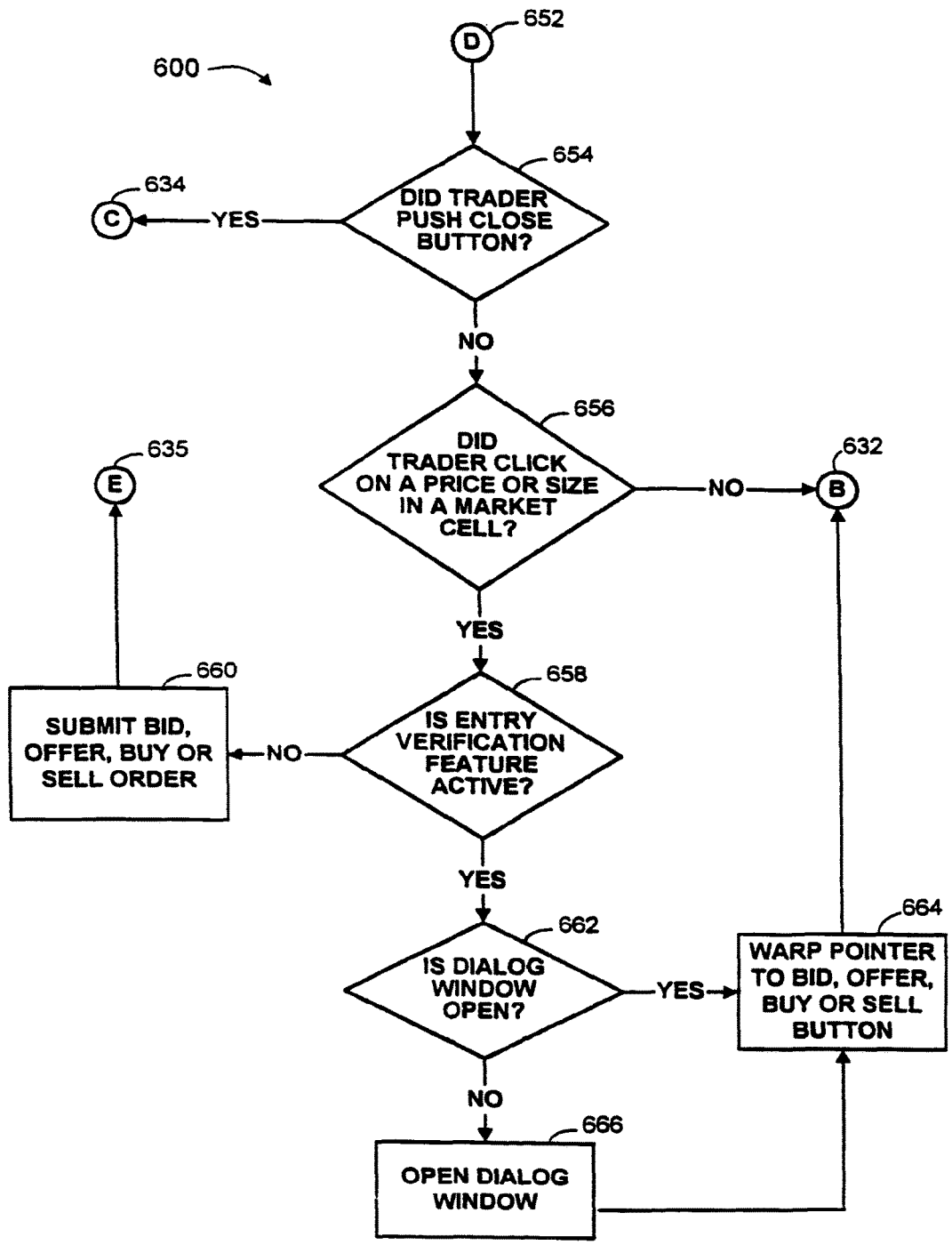

One embodiment of a main process 600 that may be used to control the presentation of the interfaces illustrated in FIGS. 1-5 is illustrated in FIGS. 6A-6C. As shown in FIG. 6A, once process 600 has begun at step 602, the process may load trading interface settings at step 604. The setting loaded at step 604 may include all of the settings configurable through screens 200, 300, 400, and 500, and any other suitable settings. Once these settings are loaded, process 600 may display a dialog window 200 at step 606. Based upon the settings loaded at step 604, process 600 then determines whether the item configured to be traded in dialog window 200 is to be displayed in a market cell. If it is, then process presents a market cell 100 at step 610. Otherwise, or after displaying the market cell, process 600 proceeds to step 612 where the process waits for trader input.

Figure 7:
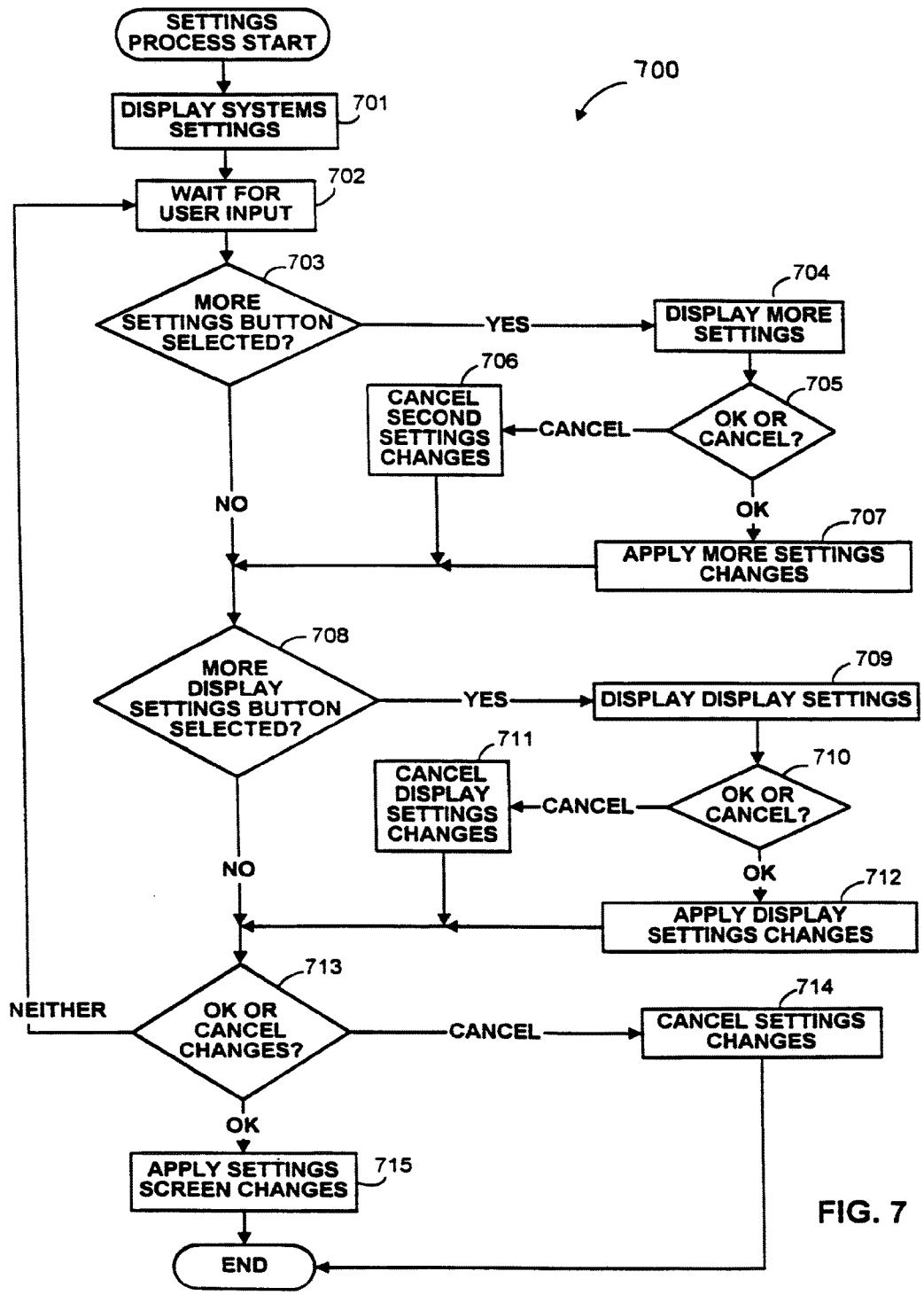
FIG. 7 is a flow diagram of a settings process that may be used to configure settings illustrated in FIGS. 1-5 in accordance with certain embodiments of the present invention.

Once trader input has been received at step 612, process 600 determines whether the trader pushed settings button 241 in dialog window 200. If the trader did push the settings button, then process runs a settings process at step 616. An example of a settings process is shown in FIG. 7. Once the settings process is completed, process 600 proceeds back to step 612 to wait for more trader input. If process 600 determines that the trader did not push the settings button at step 614, however, then process 600 proceeds to step 618 to determine if the trader pushed a bid button 212, an offer button 214, a buy button 204, or a sell button 206. If the trader did push one of these buttons, then the corresponding order is placed at step 620. Otherwise, process 600 proceeds to step 622 to determine if the trader pushed one of cancel buttons 208, 210, 216, 218, 220, or 222. If so, then process 600 cancels the corresponding orders that can be canceled at step 624. Once an order has been placed at step 620, or orders have been canceled at step 624, process 600 determines at step 626 whether "close on action" box 238 is checked in dialog window 200. If not, process 600 loops back to step 612. Otherwise process 600 closes dialog window 200 at step 628 and then proceeds to step 612.

If, at step 622, process 600 determines that the trader did not push a cancel button, however, then process 600 proceeds to step 634 as shown in FIG. 6B via link 630. At step 634, process 600 determines whether the trader pushed a price or size up or down button 226, 228, 232, or 234. If the trader did push one of these buttons, process 600 changes the price or size accordingly at step 636 and then loops back to step 612 via link 632. Otherwise, process 600 proceeds to step 638 to determine if the trader pushed a button on keypad 202. If the trader did push one of these buttons, then the process changes the value of either the price or size highlighted accordingly at step 640 and then loops back to step 612 via link 632. If the trader did not push one of the keypad buttons, process 600 next determines at step 642 whether the trader entered a value in price or size field 224 or 230. If the trader did enter a value, then process 600 changes the value in that field accordingly at step 640 and loops back to step 612 via link 632.

If process 600 determines at step 642 that the trader did not enter a value in one of the price or size fields, then process 600 determines at step 644 whether the trader changed the trade type preference 236. If the trader did change this preference, the trade type preference is changed at step 646 and process 600 loops back to step 612 via link 632. Otherwise, process 600 determines at step 648 whether the trader pushed configure keypad button 240. If the trader did push this button, then the process allows the trader to drag buttons in dialog window to new locations until the trader pushes the configure keypad button again. The new locations of the relocated buttons are then stored as settings for dialog window 200 that are loaded at step 602 and used to define the button locations each time the dialog window is opened.

If process 600 determines at step 648 that the trader did not push the configure keypad button, then process 600 proceeds to step 654 via link 652. At step 654, process determines if the trader pushed close button 242. If so, then process 600 loops back to step 628 via link 634 to close dialog window 200. Otherwise, process 600 determines at step 656 whether the trader clicked on a price 102 or 104 or size 106 or 108 in market cell 100. If not, process 600 loops back to step 612 via link 632 to wait for more trader input.

If the trader did click on a price or size in the market cell, then process 600 determines whether the entry verification feature is active at step 658. If the entry verification feature is not active, then process 600 submits a bid, offer, buy, or sell order based upon which price or size button was clicked, as described above, and then proceeds to step 626 via link 635. Otherwise, process 600 next determines whether dialog window 200 is open at step 662. If the dialog window is not open, then process 600 opens a dialog window 200 at step 666. After opening dialog window 200 at step 666, or if the dialog window was determined to be open at step 662, process 600 warps the pointer to the bid, offer, buy, or sell button based upon what was clicked in the market cell, and then process 600 loops back to step 612 via link 632.

One embodiment of a system settings process 700 that may be used to set system setting as illustrated in FIGS. 3-5 is shown in FIG. 7. As can be seen, upon pressing settings button 241 (FIG. 2), process 700 will preferably display system settings screen 300 as described in connection with FIGS. 3-5 at step 701. After displaying the system settings screen, process 700 awaits user input at step 702. Once user input is received, at step 703, process 700 determines whether the trader selected "more settings" button 302. If the trader selects "more settings" button 302, process 700 displays a second settings screen at step 704, as described in the description of FIG. 4. At step 704, the trader may then have an opportunity to adjust any setting on the second settings screen, and, at step 705, process 700 determines whether the trader pressed "OK" button 422 or "Cancel" button 424. If process 700 determines that the trader selected "Cancel" button 424, any changes made by the trader in the second settings screen will be ignored at step 706. If, however, the trader selected "OK" button 422, process 600 will proceed to step 707 and apply any changes made by the trader in the second settings screen.

If, at step 703, the trader was determined to not have chosen the "more settings" button, or after the completion of either step 706 or step 707, process 700 branches to step 708. At step 708, process 700 determines whether the trader selected the "more display settings" button from screen 300. If so, then process 700 displays display settings screen 500 at step 709. Next, at step 710, process 700 determines whether the trader selected "OK" button 514 or "Cancel" button 516 within display settings screen 500. If the trader pressed "Cancel" button 516, process 700 cancels any display settings changes at step 711. If the trader pressed "OK" button 514, process 700 applies any display settings changes at step 712.

After completing step 711 or 712, or if process 600 determines that the "more display settings" button was not selected at step 708, process 700 determines whether the trader selected "OK" button 312 or "Cancel" button 314 at step 713. If neither "OK" button 312 or "Cancel" button 314 was selected, process 700 loops back to step 702 where the process will once again await user input. If the trader selected "Cancel" button 314, however, process 700 will proceed to step 614 and cancel all changes made at the system settings screen. Hitting "Cancel" button 314, however, preferably will not cancel changes that the trader may have made in the second setting screen displayed at step 704 or in the display settings screen display at step 709. If the trader, selected "OK" button 312, process 700 will proceed to step 715. Step 715 accepts and applies any changes made in the system settings screen. After completing step 714 or 714, process 700 terminates.

Figure 8:
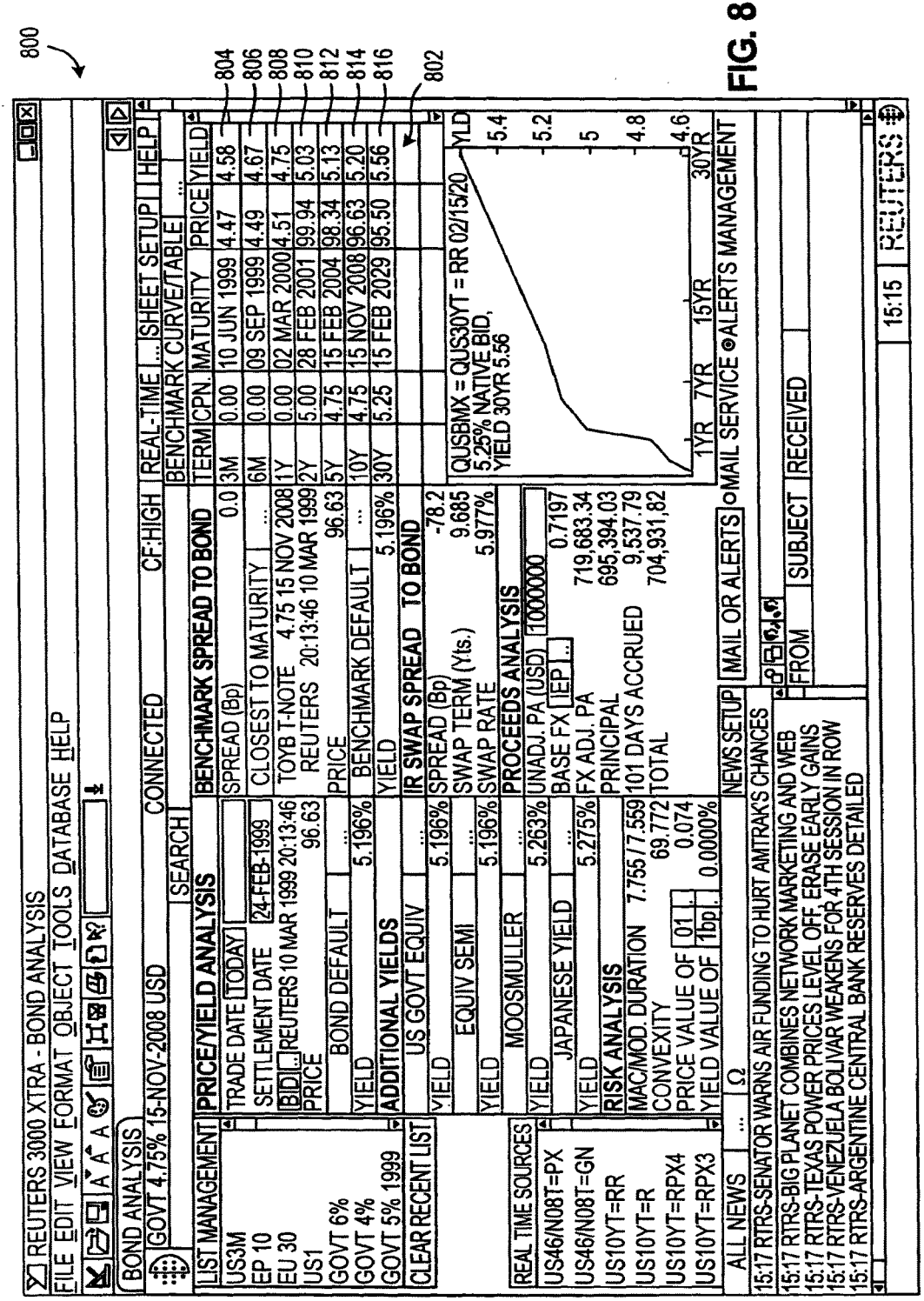
FIG. 8 is an illustration of an entry window that may be used to select items to be traded using the dialog window of FIG. 2 in accordance with certain embodiments of the present invention.

In accordance with the present invention, a data window may be used in addition to or instead of market cell 100 to initiate or submit order commands via dialog window 200. The Data window may be any window for displaying data on tradable items. For example, a data window may be a market data display, a web page including financial data or auction information, a spread sheet, etc. As another example, as shown in FIG. 8, a data window 800 may be used for this purpose. Data window 800 is a Bond Analysis window that is part of the Reuters 3000 Xtra product that is available from Reuters Limited. Within data window 800 is a field 802 that contains information on various bonds 804-816. By clicking on any of bonds 804-816, a trader can cause a bid order command to be submitted via dialog window 200.

Figure 9:
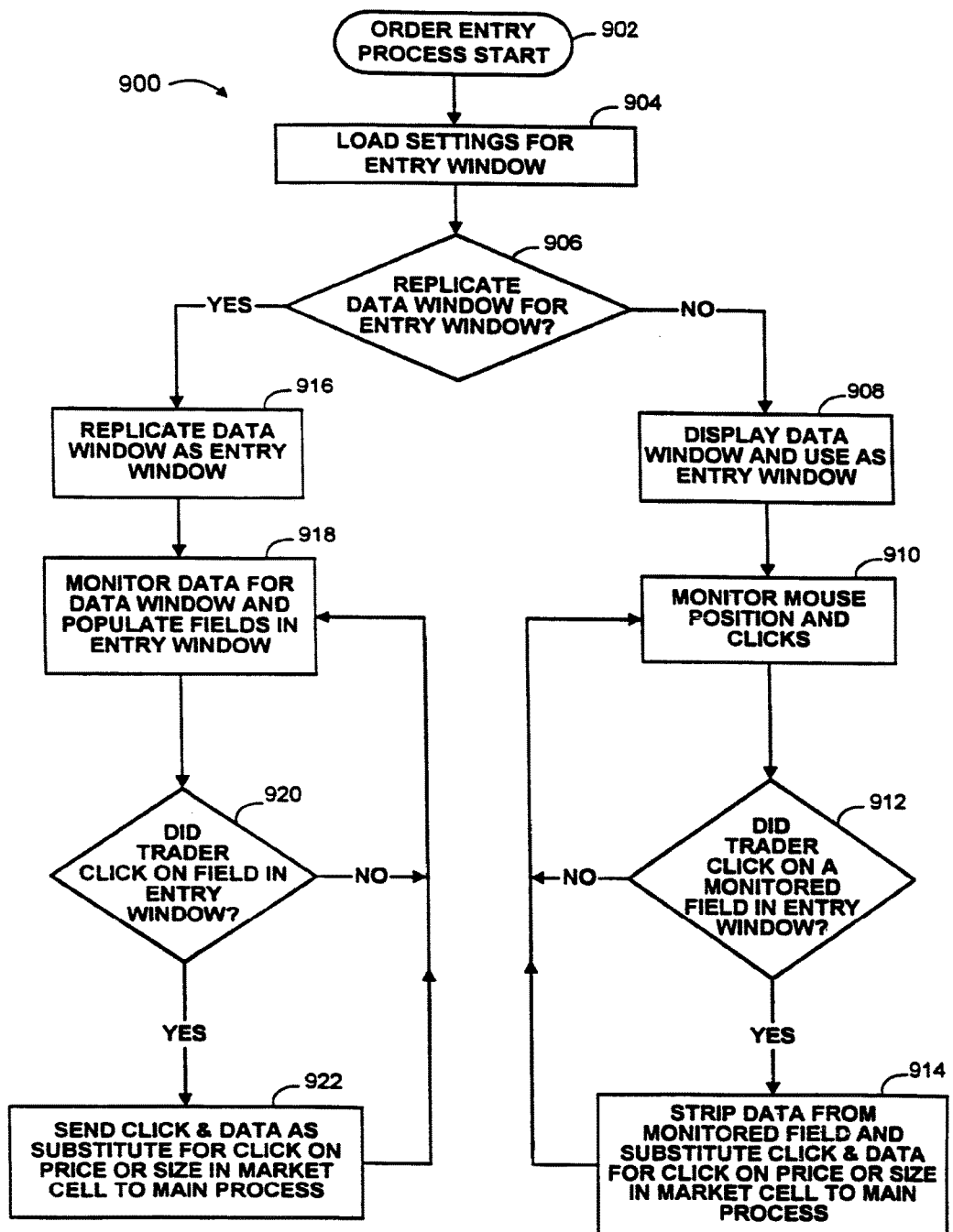
FIG. 9 is a flow diagram of an entry window process that may be used to interface the entry window of FIG. 8 with the dialog window of FIG. 2 in accordance with certain embodiments of the present invention.

An example of an order entry process 900 for enabling the submitting of order commands via dialog window 200 and a data window is shown in FIG. 9. Through this process, an entry window that is either a replica of the data entry window or the data window itself is used to detect when a trader selects an item within the data window. As illustrated, after process 900 has begun at step 902, this process loads settings for an entry window at step 904. Next, based upon the settings loaded, process 900 determines at step 906 whether to replicate a data window for the entry window or to use the data window itself as the entry window. If the data window is to be replicated for the entry window, then process 900 proceeds to step 916 at which the data window is replicated as the entry window. Although replication of the data window is illustrated as part of process 900, replication may be performed using an automated process or may be performed in conjunction with manual copying of the data window.

Next, at step 918, process 900 monitors data that is being sent to the data window and populates fields within the entry window with that data. Through steps 916 and 918, the entry window preferably appears identical to the data window. Alternatively, the entry window may be different from the data window and use the data window data. Following step 918, process 900 determines at step 920 whether a trader clicked on a field in entry window. As part of the replication of the data window, the entry window is preferably constructed to facilitate detection of clicks on various fields within the entry window. If the trader did click on a field in the entry window, the click and corresponding data in the entry window are sent to dialog window 200 as a substitute for a click on a price or size in market cell 100 at step 922. The click and corresponding data are preferably detected by main process 600 at step 656 and appear to process 600 like a click on a price or size in a market cell. Because the trader may click on a variety of items in the entry window, the data accompanying the click may be used by process 600 to select another tradable item prior to submitting a bid, offer, buy, or sell command. If no click is detected at step 920, or after the click and data have sent to main process 600 at step 922, process 900 loops back to step 918.

If, at step 906, process 900 determines that the data window is not to be replicated, then process 900 displays the data window and uses the data window as the entry window. Because the data window may not be an interactive window, process 900 may monitor the mouse position and clicks at step 910 to determine whether the trader is trying to click on an element in the data window as the entry window. Next, at step 912, process 900 determines whether the trader clicked on a monitored field in the entry window. If the trader did click on a monitored field, process 900, at step 914, strips the data from the monitored field, substitutes the click and stripped data for a click on a price or size in the market cell, and sends that click and data to main process 600. The data may be stripped by monitoring the data being fed to the data window, by scanning video memory corresponding to the field of the data window clicked on, or using any other suitable process. The click and stripped data are preferably detected by main process 600 at step 656 and appear to process 600 like a click on a price or size in a market cell. Because the trader may click on a variety of items in the entry window, the data accompanying the click may be used by process 600 to select another tradable item prior to submitting a bid, offer, buy, or sell command. If no click is detected at step 912, or after the click and data have sent to main process 600 at step 914, process 900 loops back to step 910.

Figure 10:
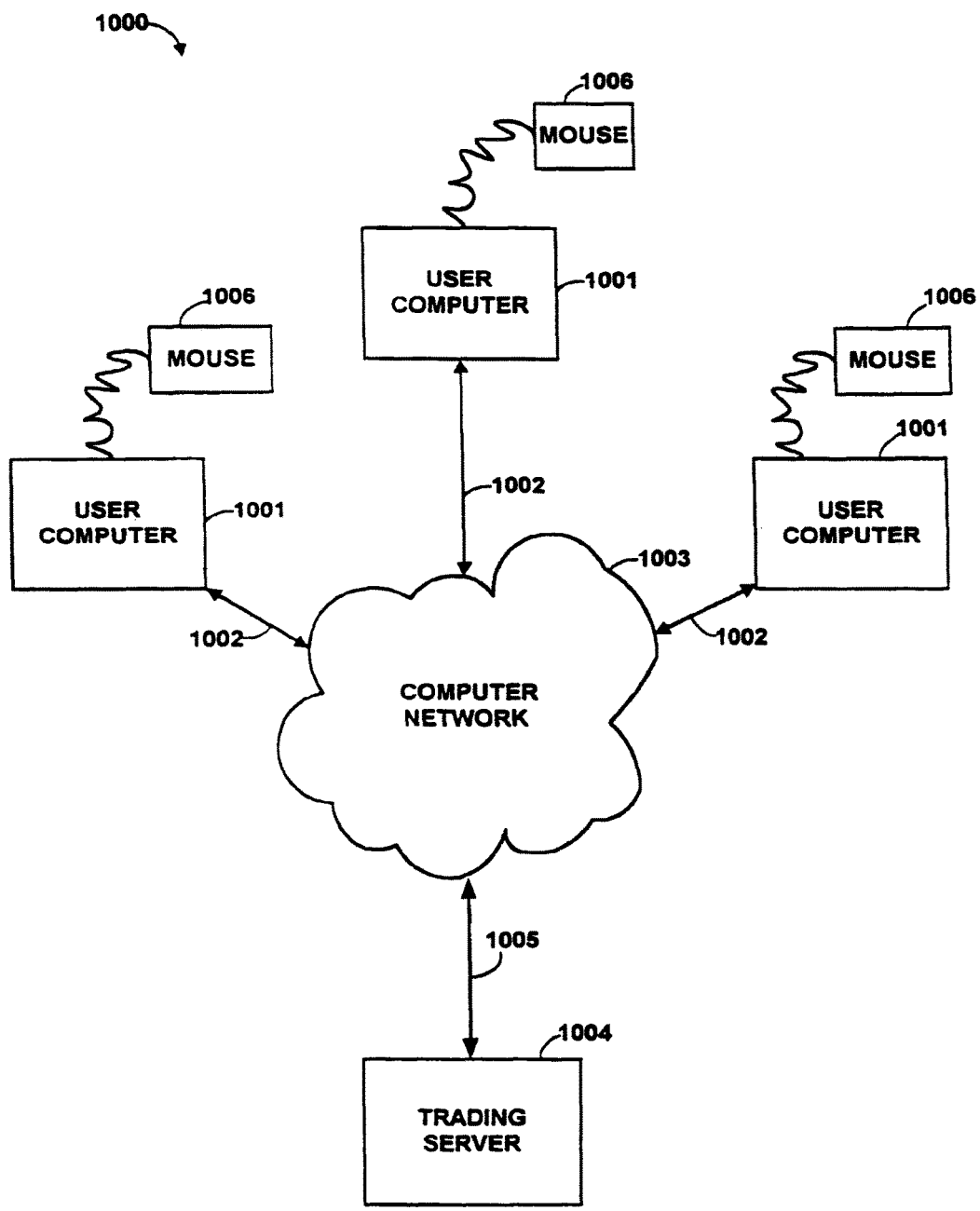
FIG. 10 is a block diagram of a system that may be used to implement the processes and functions illustrated in FIGS. 1-9 in accordance with certain embodiments of the present invention.

One example of a system 1000 for implementing the present invention is shown in FIG. 10. As illustrated, system 1000 may include one or more computers 1001, including a mouse 1006, that are connected by one or more communication links 1002 to a computer network 1003 that is linked via a communication link 1005 to a trading server 1004.

In system 1000, trading server 1004 may be any suitable server, processor, computer, or data processing device, or combination of the same. Computer network 1003 may be any suitable computer network including the Internet, an Intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 1002 and 1005 may be any suitable communication links suitable for communicating data between computers 1001 and server 1004, such as network links, dial-up links, wireless links, hard-wired links, etc. User computers 1001 may be any suitable computers, processors, computer terminals, displays, portable computers, personal digital assistants, or any other suitable data processing devices, or combinations of the same.

It should be obvious to one of ordinary skill in the art that the present invention may be practiced in embodiments other than those illustrated herein without departing from the spirit and scope of the present invention, and that the invention is only limited by the claims which follow.

What is claimed is:

1. An apparatus, comprising:
   a memory;
   an electronic display device;
   at least one processor to:
   render on the electronic display device a first interface that comprises a first variable associated with trading an item, in which the first variable comprises a price of the item;
   render, on the electronic display device, data in a second interface in response to a selection of the first variable at the first interface, in which the second interface comprises an adjustable price field associated with the trading item, an adjustable size field associated with the trading item, and a button which initiates a trading command when selected;
   automatically reposition a cursor immediately above the button;
   automatically populate the adjustable size field with a predetermined size;
   receive a selection of the button; and
   submit the trading command for execution in response to receiving the selection.

2. The apparatus of claim 1, in which the at least one processor is further configured to render the first interface at a remote device that is connected to the apparatus via a network.

3. The apparatus of claim 1, in which the at least one processor is further configured to reposition the second interface from a first location to a second location.

4. The apparatus of claim 1, in which the second interface further comprises a size up button and the at least one processor is further configured to adjust a value in the adjustable size field, in response to a selection of at least one of the size up button and the size down button.

5. The apparatus of claim 1, in which wherein the second interface further comprises at least one numeric button and the at least one processor is further configured to adjust a value in the adjustable size field, in response to a selection of the at least one numeric button.

6. The apparatus of claim 5, in which the at least one numeric button comprises a button for a number 1; a button for a number 5; a button for a number 10; and a button for a number 100.

7. The apparatus of claim 1, in which the second interface comprises:
a price up button and a price down button, in which the price up button when selected increases the price displayed in the price field and in which the price down button when selected decreases the price displayed in the price field.

8. The apparatus of claim 1, in which the second interface further comprises at least one cancel button for canceling a selection of a first trading command.

9. A method comprising
rendering, by at least one processor, on an electronic display device, a first interface that comprises a first variable associated with trading an item, in which the first variable comprises a price of the item;
rendering, by at least one processor, on an electronic display device, data in a second interface in response to a selection of the first variable at the first interface, in which the second interface comprises an adjustable price field associated with the trading item, an adjustable size field associated with the trading item, and a button which initiates a trading command when selected;
repositioning, by the at least one processor, a cursor immediately above the button;
populating, by the at least one processor, the adjustable size field with a predetermined size;
receiving, by the at least one processor, a selection of the button; and
submitting, by the at least one processor, the trading command for execution in response to receiving the selection.

* * * * *